(12) United States Patent
Nelson

(10) Patent No.: US 10,896,573 B2
(45) Date of Patent: Jan. 19, 2021

(54) DECOMPOSITION OF DISPLAYED ELEMENTS USING GAZE DETECTION

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 161 days.

(21) Appl. No.: 15/720,337

(22) Filed: Sep. 29, 2017

(65) Prior Publication Data

US 2019/0102986 A1    Apr. 4, 2019

(51) Int. Cl.
| | | |
|---|---|---|
| *G07F 17/32* | (2006.01) | |
| *G06F 3/01* | (2006.01) | |
| *A63F 13/52* | (2014.01) | |
| *G06F 3/0481* | (2013.01) | |

(52) U.S. Cl.
CPC .......... *G07F 17/3239* (2013.01); *A63F 13/52* (2014.09); *G06F 3/011* (2013.01); *G06F 3/013* (2013.01); *G06F 3/016* (2013.01); *G06F 3/017* (2013.01); *G06F 3/04815* (2013.01); *G07F 17/3206* (2013.01); *G07F 17/3209* (2013.01); *G07F 17/3258* (2013.01); *G07F 17/3267* (2013.01)

(58) Field of Classification Search
CPC ........... A63F 13/52; A63F 13/533; A63F 3/01
See application file for complete search history.

(56) References Cited

U.S. PATENT DOCUMENTS

| | | | |
|---|---|---|---|
| 6,222,465 B1 | 4/2001 | Kumar et al. | |
| 7,815,507 B2 | 10/2010 | Parrott et al. | |
| 8,643,680 B2 | 2/2014 | Baldwin et al. | |
| 8,721,422 B2 | 5/2014 | Casey et al. | |
| 9,244,527 B2 | 1/2016 | Lathrop et al. | |
| 9,308,439 B2 | 4/2016 | Aoki et al. | |
| 9,715,781 B2 | 7/2017 | Lyons et al. | |
| 2011/0304606 A1 | 12/2011 | Walsh | |
| 2012/0105486 A1 | 5/2012 | Lankford et al. | |
| 2012/0231885 A1* | 9/2012 | Speer, II | G07F 17/32 463/31 |
| 2012/0322542 A1 | 12/2012 | Chudd et al. | |
| 2014/0323194 A1 | 10/2014 | Keilwert | |
| 2015/0169053 A1 | 6/2015 | Bozarth et al. | |
| 2016/0180644 A1* | 6/2016 | Idris | G07F 17/3225 463/20 |
| 2016/0252957 A1 | 9/2016 | Raux | |
| 2017/0168570 A1* | 6/2017 | Froy | G06F 3/016 |
| 2017/0169653 A1* | 6/2017 | Froy | G07F 17/3209 |
| 2017/0169662 A1* | 6/2017 | Froy | G06F 3/005 |
| 2017/0236363 A1* | 8/2017 | Froy | G07F 17/3209 463/25 |

* cited by examiner

*Primary Examiner* — Jay Trent Liddle
*Assistant Examiner* — Alex P. Rada, II
(74) *Attorney, Agent, or Firm* — Sage Patent Group

(57) ABSTRACT

A method of operating an electronic gaming machine includes detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

26 Claims, 20 Drawing Sheets

DECOMPOSITION OF DISPLAYED ELEMENTS USING GAZE DETECTION

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to the field of electronic gaming machines, and in particular to electronic gaming machines that track a player's eye gaze.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. As EGMs and the content displayed on EGMs becomes more complex, there is an increasing need to provide more intuitive and functional systems and methods for players to interact with the EGMs.

SUMMARY

A method of operating an electronic gaming machine includes detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

The element of the electronic gaming machine may include a mechanical element of the electronic gaming machine.

The element of the electronic gaming machine may include an item displayed on the display device.

The display device may include a first display device, and the element of the electronic gaming machine may include an item displayed on a second display device.

The display device may include a three-dimensional display device, and wherein displaying the additional information may include displaying the additional information as a three-dimensional element.

The identified element may include a three-dimensional object displayed by the display device, and wherein displaying the additional information may include displaying the additional information as a three-dimensional object instead of the identified element.

The identified element may include a three-dimensional object displayed by the display device, and wherein displaying the additional information may include displaying the additional information as a three-dimensional object in front of the identified element.

The display device may include a three-dimensional display device, and the element of the electronic gaming machine may include a three-dimensional element displayed by the three-dimensional display device having an apparent spatial position. The method may further include detecting a location of at least a portion of a hand of the operator; determining if the location of the at least one portion of the hand of the operator corresponds to the apparent spatial position of the three-dimensional element; and displaying the additional information in response to the gaze direction of the operator and the location of the at least one portion of the hand of the operator.

The element of the electronic gaming machine may include an information item that is a composite of sub-information items that are not displayed with the information item, and wherein the additional information may include the sub-information items that compose the information item.

The display device may include a three-dimensional display device, and displaying the additional information may include displaying the additional information as a three-dimensional element having an apparent spatial position. The method may further include detecting a location of at least a portion of a hand of the operator; determining if the location of the at least one portion of the hand of the operator corresponds to the apparent spatial position of the three-dimensional element; and removing the three dimensional element that displays the additional information in response to the location of the at least one portion of the hand of the operator corresponding to the apparent spatial location of the three-dimensional element.

The method may further include detecting a selection gesture by the operator, wherein removing the three dimensional element is performed in response to the selection gesture and the location of the at least one portion of the hand of the operator corresponding to the apparent spatial location of the three-dimensional element.

The additional information may include current information about a game being played on the electronic gaming machine.

The additional information may include historical information about previous games played on the electronic gaming machine.

The method may further include starting a timer in response to identifying the element of the electronic gaming machine corresponding to the location on the electronic gaming machine towards which the gaze of the operator is directed. Displaying the additional information may be performed in response to the timer exceeding a predetermined threshold while the operator's gaze continues be directed toward the identified element.

The method may further include determining a number of times within a predetermined time period that the operator's gaze is directed toward the identified element, and displaying the additional information may be performed in response to the number of times within the predetermined time period that the operator's gaze is directed toward the identified element exceeding a predetermined threshold value.

The element may include a second element, and the method may further include determining that the operator's gaze was directed toward first element prior to being directed toward the second element. Displaying the additional information may be performed in response to the operator's gaze being directed to the first element followed by the second element.

Some embodiments provide computer program products including a non-transitory computer readable storage medium on which computer program instructions are stored, the computer program instructions configuring an electronic game machine to perform operations including detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

Still further embodiments provide an electronic game machine including a processor circuit and a memory coupled to the processor circuit and storing computer program instructions that configure the electronic gaming machine to perform operations including detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

Still further embodiments provide an electronic game machine comprising a processor circuit, a memory coupled to the processor circuit, a display device, and a gaze detection unit. The gaze detection unit is configured to detect a gaze direction of the player. The processor circuit is configured to identify a location on the electronic gaming machine towards which the gaze of the operator is directed; identify an element of the electronic gaming machine corresponding to the location on the electronic gaming machine towards which the gaze of the operator is directed; determine if additional information regarding the identified element is available; and display the additional information on a display device that is visible to the operator.

A method of operating an electronic gaming machine according to further embodiments includes conducting a game on the electronic gaming machine; determining an expected gaze pattern of a player of the game; detecting an actual gaze pattern of the player; determining whether the actual gaze pattern of the player matches the expected gaze pattern; in response to determining that the actual gaze pattern of the player does not match the expected gaze pattern, determining if additional information regarding the game is available; and in response to determining that additional information is available, displaying the additional information to the player.

A method of operating an electronic gaming machine according to further embodiments includes conducting a game on the electronic gaming machine; determining an outcome of the game; detecting a gaze direction of a player of the electronic gaming machine; determining whether a triggering event has occurred; in response to determining that the triggering event has occurred, determining if additional information regarding the game is available; and in response to determining that additional information is available, displaying the additional information to the player.

Some further embodiments provide computer program products including a non-transitory computer readable storage medium on which computer program instructions are stored, the computer program instructions configuring an electronic gaming machine to perform operations including detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

Some embodiments provide an electronic gaming machine including a processor circuit and a memory coupled to the processor circuit and storing computer program instructions that configure the electronic gaming machine to perform operations including detecting a gaze direction of an operator of the electronic gaming machine; identifying a location on the electronic gaming machine towards which the gaze of the operator is directed; identifying an element of the electronic gaming machine corresponding to the location on the electronic gaming machine towards which the gaze of the operator is directed; determining if additional information regarding the identified element is available; and displaying the additional information on a display device that is visible to the operator.

Some further embodiments provide an electronic gaming machine including a processor; a display device; a display controller coupled to the processor and the display device; and a gaze detection unit coupled to the processor and configured to detect a gaze direction of the viewer. The processor is configured to: detect a gaze direction of an operator of the electronic gaming machine; identify a location on the electronic gaming machine towards which the gaze of the operator is directed; identify an element of the electronic gaming machine corresponding to the location on the electronic gaming machine towards which the gaze of the operator is directed; determine if additional information regarding the identified element is available; and display the additional information on the display device.

DETAILED DESCRIPTION OF EMBODIMENTS

Figure 1A:
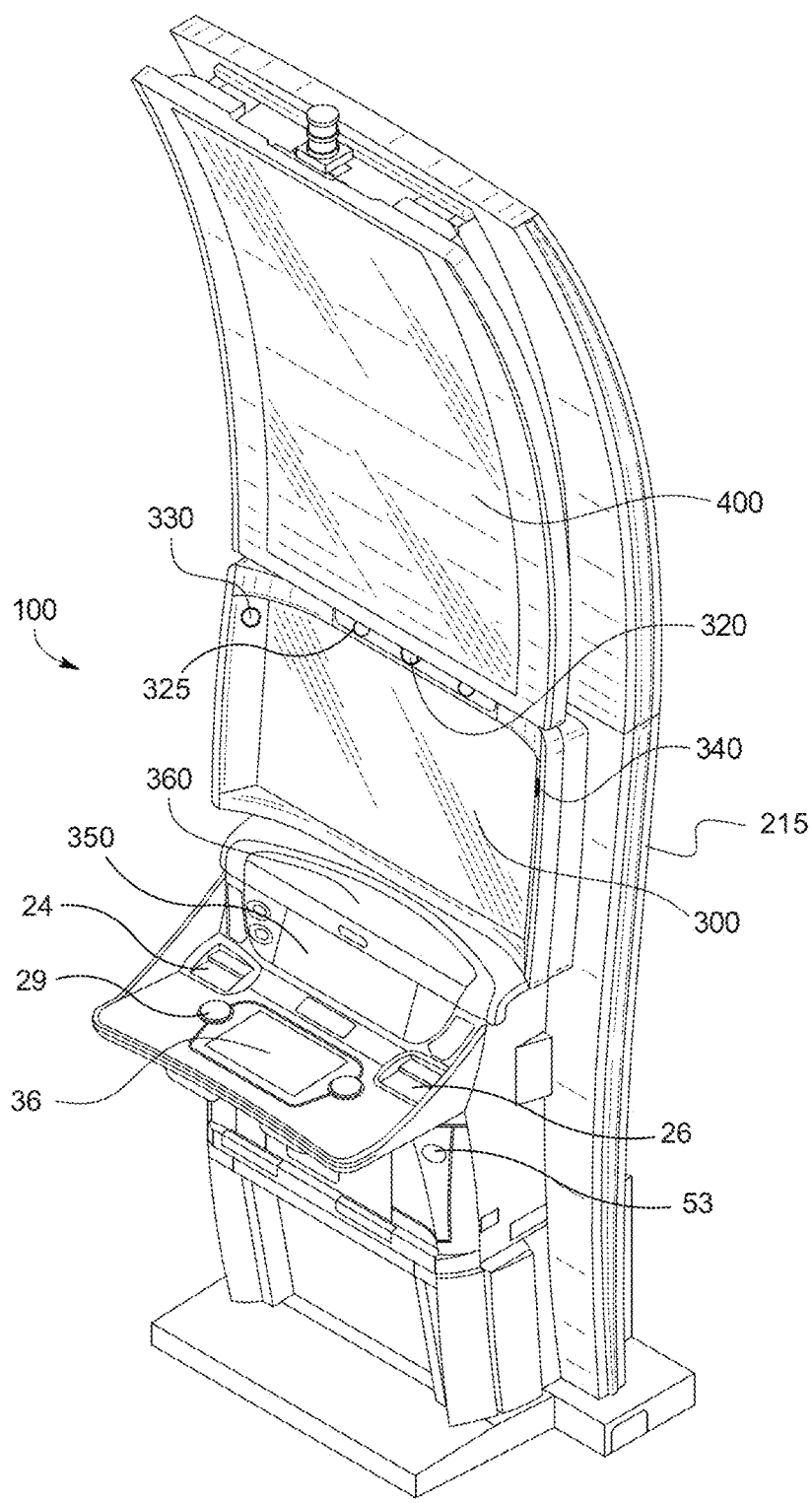
FIG. 1A is a perspective view of an electronic gaming machine according to some embodiments.

Embodiments described herein relate to enhanced electronic gaming machines (EGMs) that are capable of displaying information about various elements of the EGM, including tangible elements of the EGM, a game played on the EGM, or objects, game components or elements displayed by a display screen of the EGM. As used herein, a game component is any object, item, icon, avatar, image or other element that is displayed by a game operated on an electronic gaming machine, and may include game elements, such as reels, cards, tiles, etc., that are displayed during a current play of a game or other elements, such as information elements, counters, timers, paytables, credit meters, etc., displayed during or between plays of a game.

One problem faced by the designer of an EGM, or a game provided by an EGM, is how much information to display to a player or other user of the EGM. An operator of an EGM may desire to provide certain information about a game, such as payouts, maximum or minimum bets, jackpot history, bonus information, etc., to attract players to play the game. In addition, an operator of an EGM may be required by law or regulation to provide certain types of information to players, such as paytables, game rules, etc. However, providing information to players comes at a cost, as it takes up valuable display or cabinet space on an EGM, requires time for the player to read, and may delay or interfere with game play. The EGM designer must therefore make certain tradeoffs in terms of how much information is displayed, where it is displayed, and when it is displayed. Unfortunately, however, the ultimate choices made by the designers may not be suitable for all players.

For example, different players have different levels of experience with EGMs in general and different levels of familiarity with particular EGMS, or games provided on EGMs. Players with little experience or familiarity may desire to have more information provided to them before, during or after game play, while players with more experience or familiarity may desire less information. In addition, some players naturally desire to receive more information about games, while others naturally desire less information.

Some embodiments of the present inventive concepts utilize gaze detection capabilities of an EGM as a trigger for displaying information or additional information to a user or player of the EGM. To facilitate the use of gaze detection, the EGM may include at least one data capture camera device that is configured to monitor the eye gaze of the player to collect player eye gaze data. Such monitoring may be performed continuously or selectively when eye gaze data is needed. Player eye gaze detection are described in more detail below.

The EGM may be configured with algorithms to process image data from the data capture camera devices to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM. A game controller in the EGM may determine a location of the eye gaze of the player relative to a viewing area of an interactive game environment displayed on the EGM using the player eye gaze data. A display controller in the EGM may dynamically update the rendering of the viewing area or a portion of the viewing area to display information or additional information based on the player eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Electronic Gaming Machines

In various embodiments of the present disclosure, an EGM can provide the enhanced physical player interaction in conjunction with one or more various game components (such as but not limited to game symbols, game cards, game reels, game wheels, game tiles, game dice, game chips, game balls, game selections, game characters, game awards, game outcomes, or other game objects) or other functional aspects or functionality provided by the EGM to or for the player, using a combination of player eye gaze data and three-dimensional image manipulation.

Figure 1B:
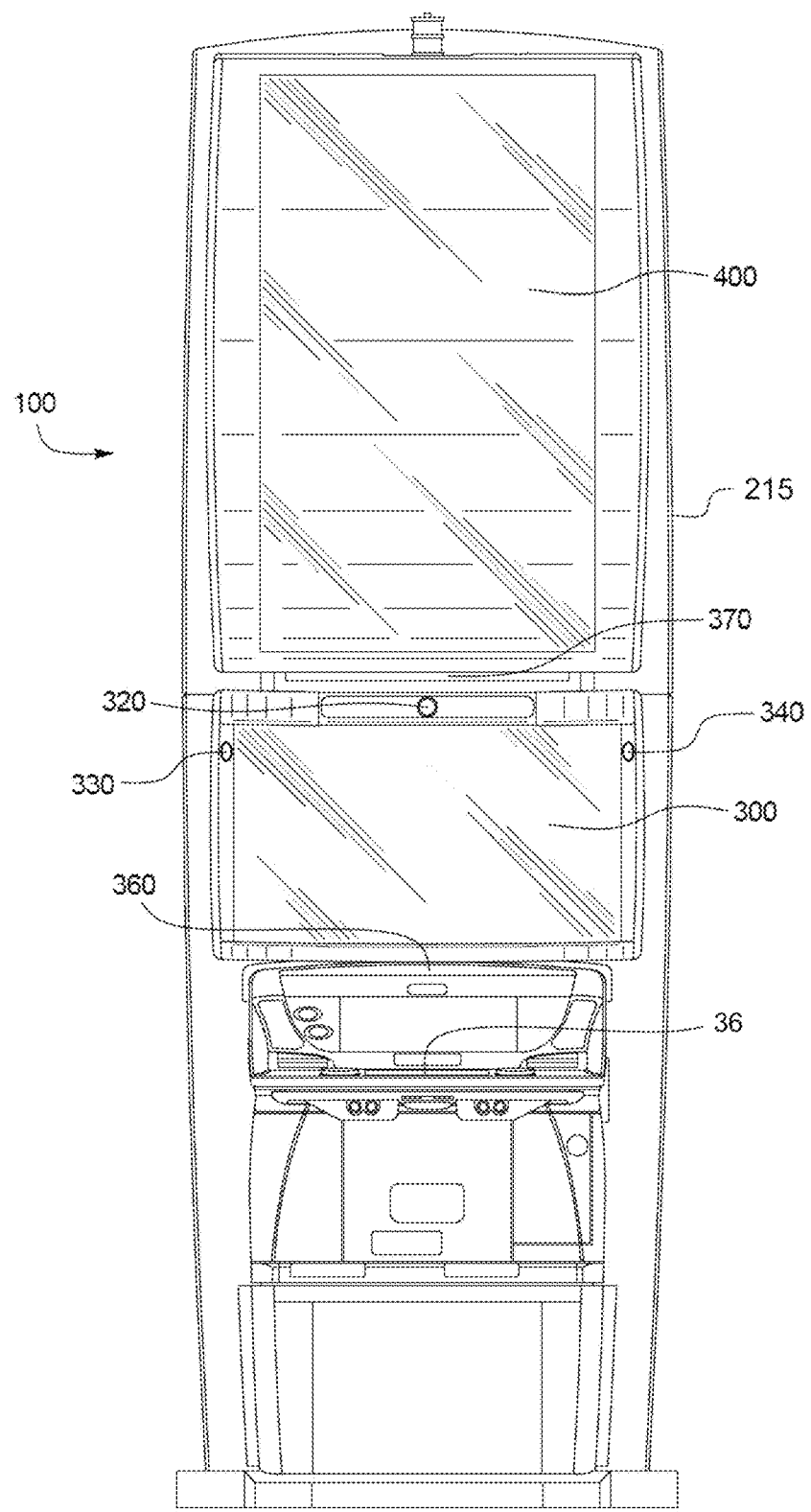
FIG. 1B is a front view of an electronic gaming machine according to further embodiments.
Figure 2:
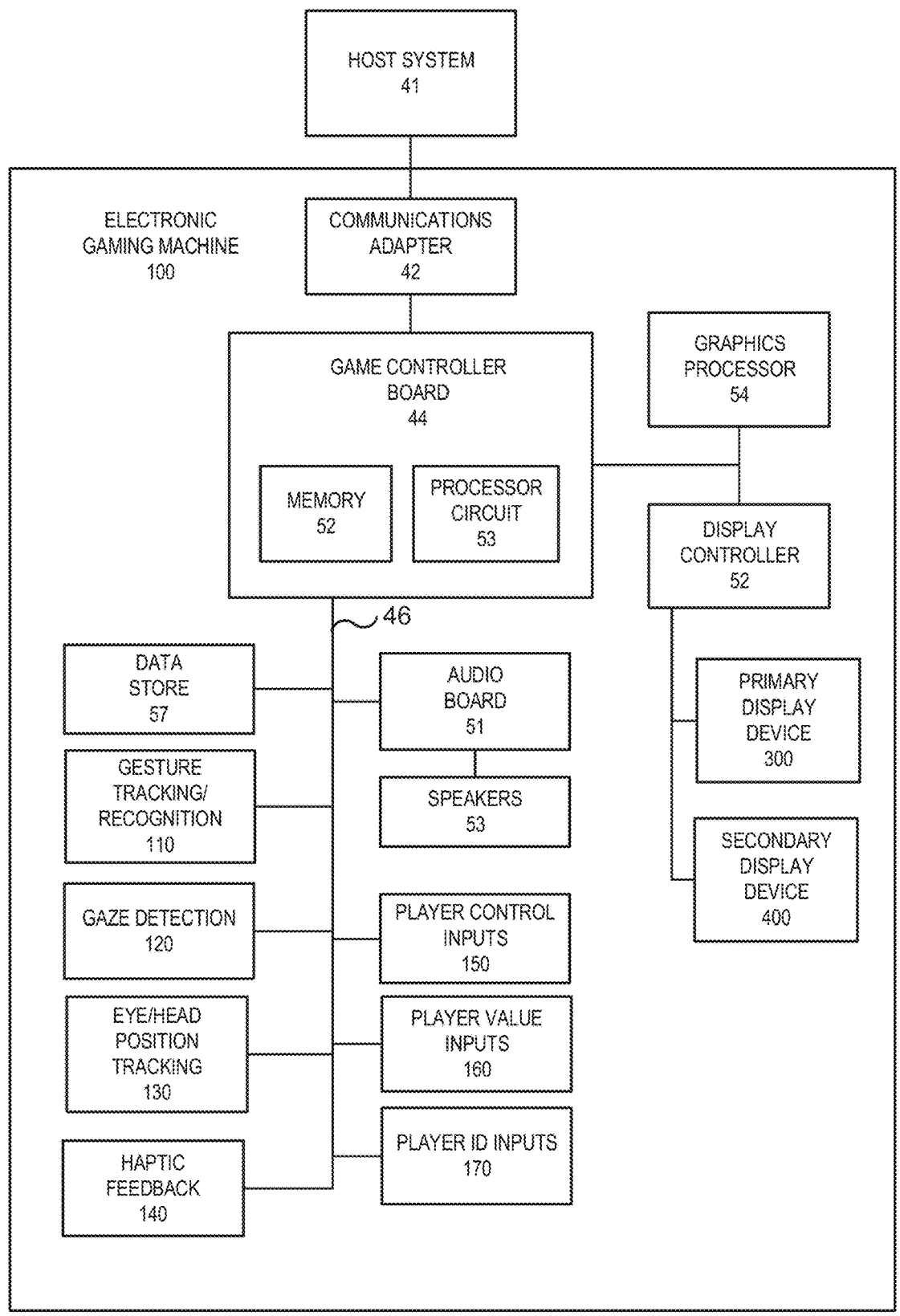
FIG. 2 is a schematic diagram of an electronic gaming machine linked to a casino host system according to some embodiments.

FIG. 1A is a perspective view and FIG. 1B is a front elevation of an EGM 100 that is configured to monitor eye gaze of a player to collect player eye gaze data, and to control the display of three-dimensional game components by the EGM in response to the player eye gaze data in accordance with some embodiments. FIG. 2 is a block diagram illustrating some functional components of the EGM 100.

The example EGM 100 illustrated in FIGS. 1A and 1B generally includes a support structure or cabinet 215 that supports a plurality of output devices and a plurality of input devices of the EGM 100, among other components. The output devices include: a primary display device 300, and a secondary display device 400 positioned above the primary display device 300. A third or lower display device 500 may be positioned below the first or intermediate display device 300. These output devices are configured to display the games, game outcomes, awards (such as the primary and secondary games awards or other game outcome awards), and other functionality and information to the player. In this illustrated example embodiment, the plurality of player input devices enable the player to play one or more wagering games provided by the EGM 100. Such player input devices can also include one or more input devices described below that are physically touchable or activatable by the player to enable the player to make inputs into the EGM 100. These output devices and input devices are configured such that a player may operate the EGM while standing or sitting, but preferably operates the EGM while the player is sitting in front of the EGM 100 such that the player's head is approximately at the same height as the primary display device 300 (as generally shown in FIGS. 4A, 4B, 4C, and 4D).

Referring to FIGS. 1A, 1B and 2, the primary display device 300, which is capable of displaying three-dimensional images to a player, may include a thin film transistor (TFT) display, a liquid crystal display (LCD), a cathode ray tube (CRT), autostereoscopic 3D display, an LED display, an OLED display, or any other type of display. The secondary display device 400 may be configured to display additional game content, non-game content, promotional content, or other content in addition to content displayed on the primary display device 300. The secondary display device 400 may have 2D display capabilities, 3D display capabilities, or both. The secondary display device 400 may provide static information, such as an advertisement for the game, the rules of the game, pay tables, pay lines, or other information, or may even display the main game or a bonus game along with the primary display device 300. Alternatively, the area for the secondary display device 400 may be a display glass for conveying information about the game. The primary display device 300 may also include a camera, sensor, and other hardware input devices. The display devices 300, 400 may display at least a portion of the visible game components of a plurality of interactive games.

In some embodiments, the primary display device 300 may be a touch sensitive display device. The player may interact with the primary display device 300 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the primary display device 300. As another example, the player may not have to touch the primary display device 300 to play the interactive game. The player may instead interact with the interactive game using their eye gaze, eye gestures, and/or body movements, as described in more detail below.

The primary display device 300 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 100 associates this X-Y location with a function to be performed. Such touch screens may be used for slot machines, for example, or other types of gaming machines. There may be an upper and lower multi-touch screen in accordance with some embodiments. One or both of display devices 300, 400 may be configured to have auto stereoscopic 3D functionality to provide 3D enhancements to the interactive game environment. The touch location positions may be 3D, for example, and mapped to at least one visible game component of the plurality of visible game components.

The EGM 100 may include a physical device for receiving and accepting value from a player, such as a coin, bill, token, printed ticket, magnetic card, or other token of value in return for which the player is granted credits on the EGM 100. For example, a ticket acceptor 24 includes an input slot that receives machine readable printed tickets and outputs printed tickets for use in cashless gaming. A bill acceptor 26 receives and validates paper money deposited by the player.

A coin tray (not shown) may receive coins or tokens from a hopper upon a win or upon the player cashing out. However, the EGM 100 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 100 may include a scanner for scanning a barcode indicative of a cryptocurrency address, such as a bitcoin, litecoin or ethereum address, to permit the EGM 100 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. The card reader 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 100 to transfer electronic data signals for player credits and the like. For example, near field communication (NFC) may be used to couple to EGM 100 which may be configured with NFC enabled hardware. This is a non-limiting example of a communication technique.

A touchpad 36 may accept player input, such as a personal identification number (PIN) or any other player information. The touchpad 36 may display a menu for instructions and other information and provides visual feedback of the keys pressed.

The EGM 100 may include a plurality of player control buttons 39 that include any buttons or other controllers needed to play the particular game or games offered by EGM 100 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The player control buttons 39 may be provided on the touchpad 36 or another digital button panel that may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 100 may include an output device, such as one or more speakers 53. The speakers may be located in various locations on the EGM 100 such as in a lower portion or upper portion. The EGM 100 may have a chair or seat portion and the speakers may be included in the seat portion to create a surround sound effect for the player. The seat portion may allow for easy upper body and head movement during play. Functions may be controllable via an on screen game menu. The EGM 100 is configurable to provide full control over all built-in functionality (lights, frame lights, sounds, and so on).

Referring to FIG. 2, the EGM 100 is shown linked to the casino's host system 41 via network infrastructure.

The EGM 100 includes a data storage device 57 that stores game data for one or more three-dimensional interactive games. The data storage device 57 may store game data for one or more primary interactive games and one or more bonus interactive games. The EGM 100 includes a display controller 52 that detects a control command from a game controller 44 of the EGM and responsive to such command may dynamically update the rendering of the viewing area.

A communications adapter 42 may contain circuitry for coupling the EGM 100 to network. The communications adapter 42 may include a network interface allowing EGM 100 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 100 may communicate over a network using a suitable protocol, such as the G2S protocols.

The communications adapter 42 may communicate, transmit and receive data using a wireless transmitter, or it may be wired to a network, such as a local area network running throughout the casino floor, for example. The communications adapter 42 may set up a communication link with a master controller and may buffer data between the network and a game controller board 44. The communications adapter 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. In addition, program modules for operating various subsystems of the EGM may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 52 to provide games with enhanced interactive game components. The graphics processor 54 may have an integrated high-speed dedicated graphics memory.

Peripheral devices/boards in the EGM 100 may communicate with the game controller board 44 via a bus 46 using, for example, an RS-232 interface. Such peripherals may include player value input devices 160, which may include a bill acceptor 26, a coin acceptor 22, and a smart card reader or other type of credit card reader 34, and player control inputs 150 (such as buttons or a touch screen). The EGM may further include one or more player identification input devices, such as a card reader for reading a player loyalty card, a biometric input, keypad, or other input device that allows the player to identify him or herself.

The player control inputs 150 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 300 may be a touch sensitive display device. The player control inputs 150 may be integrated with the display device 300 to detect player interaction input at the display device 300.

The game controller board 44 may also control one or more devices that produce the game output including audio and video output associated with a particular game that is presented to the user. For example, an audio board 51 may convert coded signals into analog signals for driving speakers.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 100, or may reside at the host system 41. In some embodiments, the electronic data store storing game data may reside in the cloud.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller board 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller board 44. The electronics on the various boards may be combined onto a single board. The display controller 52 may control output to one or more display device 300 (e.g. an electronic touch sensitive display device). The display controller 52 may cooperate with graphics processor 54 to render animation enhancements on the display device 300.

The display controller 52 may be configured to interact with graphics processor 54 to control the display device 300 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

The EGM 100 further includes functional units for performing various features described herein, including a gesture recognition unit 110, a gaze detection unit 120, an eye/head position tracking unit 130 and a haptic feedback unit 140, which are described in more detail below. Each of the functional units 110, 120, 130 and 140 may include a processing circuits, including signal processing units, and memory and/or storage that is separate from the processor circuit 53, memory 52 and/or data store 57 of the EGM 100, or may utilize resources of the game controller board including the processor circuit 53, memory 52 and/or data store 57 of the EGM 100.

Three Dimensional Display Capability Head Position Tracking

As described herein, the EGM 100 may be configured to provide an interactive game environment that displays three-dimensional interactive game content to a player. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 300. The interactive game environment or the viewing area may be dynamically updated based on the eye gaze, eye gesture, or movement of the player as described in more detail below.

The update to the interactive game environment or the viewing area may be a graphical animation effect displayed on the display device 300. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 100.

In some embodiments, the EGM 100 may include a display device 300 with autostereoscopic 3D functionality. An autostereoscopic 3D display projects a three-dimensional image to a viewer. The three-dimensional image can be perceived by the viewer without the need for the viewer to use special glasses, such as three-dimensional viewing glasses or a three-dimensional viewing headset. Autostereoscopic displays operate by projecting different images to the viewer's left and right eyes. The two images are synthesized by the viewer into a single three-dimensional image. Separate images may be projected to the viewer's left and right eyes, for example, by locating the viewer's head in three-dimensional space and projecting the left and right images to the player using one or more lenticular lenses.

The lenticular lense(s) cause certain pixels of the screen to be visible only to the player's right eye and certain other pixels of the screen to be visible only to the left eye of the player. When the player's head position is changed, the display device also changes the pixel positions for the left eye and the right eye of the player. The head position or changes thereto determined by an eye/head position tracker are used by the EGM to choose or select the correct pixels for the left eye and the right eye of the player.

It should also be appreciated that other suitable eye tracking or head tracking systems or devices can be employed in accordance with the present disclosure.

In this illustrated example embodiment, the EGM 100 includes a player eye/head position tracking unit 130 that is configured to track the location of the head of the player. The player eye/head position tracking unit 130 includes one or more head tracking cameras such as eye/head position tracking camera 320 supported by the cabinet 215 and positioned directly above the display device 300. The eye/head position tracking camera 320 is configured to track the position of the player's head as they move in front of the display device 300. More specifically, the eye/head position tracking camera 320 is configured to track the position of the player's head as they move in a head tracking zone in front of the EGM 100 such as the head tracking zone 312 shown in front of the EGM 100 in FIG. 4A. The eye/head position tracking unit 130 may also detect an angle and orientation of the player's head. In the embodiments where two or more head tracking cameras are employed, such multiple cameras work together to track the position of the player's head as they move in front of the display device 300. In various embodiments, the cameras are spaced apart by a distance that allows the cameras to view the player's head that differ by a sufficient angle (e.g., 10 degrees) to allow the cameras to capture different views of the player's head from which the position of the player's head can be more accurately estimated. For example, when the player's head is expected to be about 24 inches from the surface of the display 300, the cameras may be spaced apart by at least about 6 inches.

In various embodiments, the processor(s), memory device(s), the player head tracking unit 130, and the display device of the EGM 100 align the coordinate system of a virtual display area (or world) with the real world by using the eye/head position information obtained from the player head tracking unit 130. When the player moves his head around, the display device of the EGM 100 causes the virtual object(s) to appear to the player to stay in place where it is. Therefore, the EGM 100 uses the eye/head position to fix the object(s) in space. The actual 3D stereo projection by the display device changes according to the eye/head position, but to the player, the virtual object(s) may appear or seems to stay where it is.

It should be appreciated that the location of the head tracking zone may vary in accordance with the present disclosure based on the configuration and position of the head tracking camera. It should also be appreciated that more than one head tracking camera may be employed in the EGM in accordance with the present disclosure. It should further be appreciated that the one or more head tracking cameras may be employed in the EGM in different positions adjacent to the display device or elsewhere on the EGM in accordance with the present disclosure.

The display controller 52 may control the display device 300 using the graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 300 using the graphics processor 54. The display controller 52 may update the viewing area to trigger a graphical animation effect displayed on one or both of display device 300 representative of a visual update to the visible game components in the viewing area, the visual update based on the player eye gaze data, player eye gesture data, or player movement data.

In some embodiments, the display controller 52 may control the display device 300 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Player Gaze Detection

Referring again to FIGS. 1A and 2, the EGM 100 may include a gaze detection unit 120 including at least one gaze direction tracking camera 325 that is configured to continuously detect and monitor player the gaze direction of a player playing the EGM 100. The gaze direction tracking camera 325 may be a separate device or may be the same device as the camera device 320 used for eye/head position tracking as described above.

Images from the gaze direction tracking camera 325 are transmitted to the gaze detection unit 120 which determines a location of the eye gaze of the player(s) relative to the viewing area using the data provided by the gaze direction tracking camera 325. The gaze detection unit 120 may determine a location of the eye gaze of the player relative to the viewing area using the data provided by the data capture device, and the gaze detection unit 120 may provide player eye gaze data to the game controller 44.

The gaze direction tracking camera 325 may include a single detector configured to capture images of the player or players of the EGM 100 from a single direction or multiple detectors configured to capture images of the player or players from multiple directions. The EGM 100 may be configured to detect the presence and location of multiple players. Accordingly, eye gaze data may be captured for multiple players of an EGM 100. Accordingly, the player eye gaze data may include eye gaze data of multiple players. It will be appreciated that any reference herein to a player in the singular may include multiple players.

In some embodiments, the game controller 44 may cause the display controller 52 to dynamically update the rendering of the viewing area based on the player eye gaze data. The display controller 52 may control the display device 300 using the graphics processor 54 to dynamically update the rendering of the viewing area to provide a graphical animation effect that alters the visible game components in the viewing area based on the player eye gaze data. In some embodiments, the game controller 44 may provide a control command to the display controller 52 based on the eye gaze or eye gesture of the player, or any combination thereof. The eye gaze of the player may be the location on the display device 300 or in the three-dimensional viewing area in front of the display device 300 where the player is looking.

An eye gesture of the player may be made by the player using one or more eyes, such as widening the eyes, narrowing the eyes, blinking, and opening one eye and closing the other.

A winning outcome of the game for provision of an award may be triggered based on the eye gaze or eye gesture of the player. For example, by looking at a game component displayed by the display controller on the display device 300 for a pre-determined period of time, the player may trigger a winning outcome. The award may include credits, free games, mega pot, small pot, progressive pot, and so on.

The gaze detection unit 120 may be used for eye, gesture or motion tracking of player, such as detecting eye movement, eye gestures, player positions and movements, and generating signals defining x, y and z coordinates associated with the player's eye gaze. The EGM 100 may implement eye-tracking recognition technology using cameras, sensors (e.g. optical sensor), data receivers and other electronic hardware to capture various forms of player input. The eye gaze or eye gesture by a player may interact with the interactive game environment or may impact the type of graphical animation effect. Accordingly, the EGM 100 may be configured to capture player eye gaze input, eye gesture input, and movement input as player interaction commands.

In some embodiments, the gaze detection unit 120 may track a position of each eye of a player relative to the display device 300, as well as a direction of focus of the eyes and a point of focus on the display device 300, in real-time or near real-time. The focus direction may be the direction at which the player's line of sight travels or extends from his or her eyes to the display device 300. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the gaze detection unit 120 may monitor the eye gaze and/or eye gesture of two or more people, who may be two or more players of the interactive game, to collect the player eye gaze data and/or player eye gesture data. The player eye gaze data and/or player eye gesture data may be used such that both players may be able to play the interactive game simultaneously. The interactive game may include aspects of both cooperative and competitive play.

As previously described, the gaze detection unit 120 may track a position of a player's eyes relative to display device 300, as well as a focus direction and a focus point on the display device 300 of the player's eyes in real-time or near real-time. The focus direction can be the direction at which the player's line of sight travels or extends from his or her eyes to the display device 300. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises.

In addition, a focus point may extend to or encompass different visual fields visible to the player. For example, a foveal area may be a small area surrounding a fixation point on the display device 300 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

Figure 3:
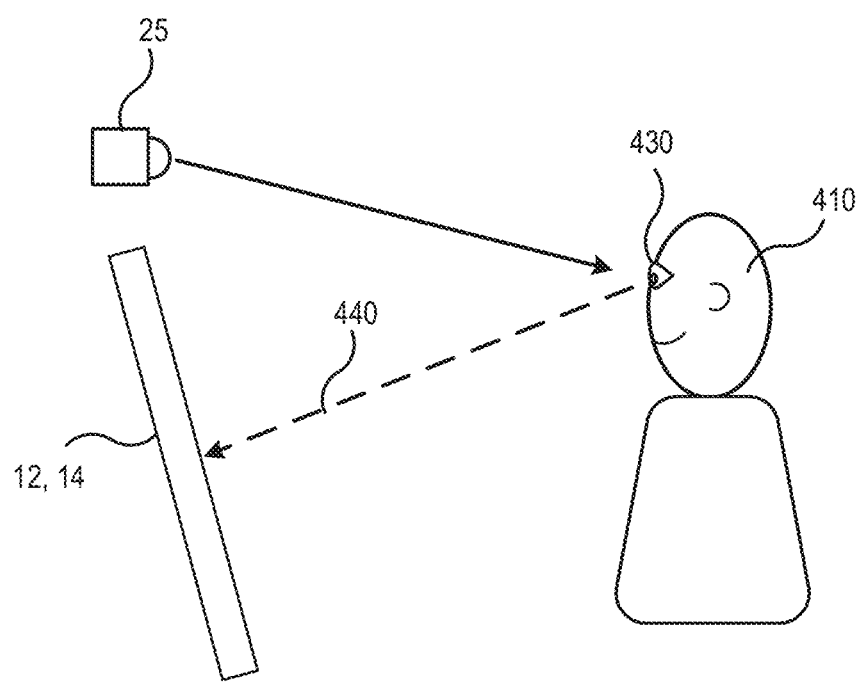
FIG. 3 is a schematic diagram illustrating the mapping of a player's eye gaze to the viewing area according to some embodiments.

Referring to FIG. 3, in some embodiments, the gaze detection unit 120 may determine the location of the eye gaze relative to the viewing area based on the position of the player's eyes relative to the EGM 100 and an angle of the player's eyes. As shown in FIG. 3, the gaze detection unit 120 may use the gaze detection tracking camera 325 to monitor the position of the player's eyes 430 relative to EGM 100, and may also monitor the angle of the player's eyes 430 to collect display mapping data. The angle of the player's eyes may define the focus of the eye gaze, which may be a line of sight relative to the display device 300. Based on the display mapping data, which may include the position of the player's eyes relative to the EGM 100 and an angle of the player's eyes or the line of sight relative, the gaze detection unit 120 may be configured to determine the direction and length of a virtual arrow 440 projecting from the player's eyes 430. The virtual arrow 440 may represent the eye gaze of the player 410. The gaze detection unit 120 and/or the game controller 44 may determine where the virtual arrow 440 intersects with the display device 300. The intersection of the virtual arrow 440 and display device 300 may represent where the eye gaze of the player 410 is focused on the display device 300. The display device 300 may be controlled by display controller 52 to display the viewing area. The gaze detection unit 120 may identify coordinates on the display device 300 corresponding to the player eye gaze data and may map the coordinates to the viewing area to determine the eye gaze of the player relative to the viewing area. The EGM 100 may determine the location of the viewing area that the player 410 is looking at, which may be useful for the EGM 100 to determine how the player 410 is interacting with the interactive game. In some embodiments, the eye gaze of the player may be expressed in 2D or 3D and may be mapped to a 2D surface, such as the surface of the display device 300, or a 3D viewing area, such as the viewing area in front of the primary display device 300.

Contactless Haptic Feedback and Gesture Recognition

Some embodiments may incorporate contactless (i.e., mid-air) haptic feedback to the player in conjunction with a three-dimensional viewing interface and gaze detection to provide a more interactive virtual experience to the player. Accordingly, an EGM 100 according to some embodiments may include a gesture recognition unit 110 including player hand position locator and haptic feedback unit 140 configured to provide tactile feedback to at least one of the player's hands in the player interaction zone based on the determined position of the player's hand. In various embodiments, the EGM 100 may provide one or more plays of primary and/or bonus games (or other functionality) with enhanced physical player interaction. In these embodiments, the EGM 100 can use the player tactile feedback provider to produce one or more sensations in the player's hand in the player interaction zone at the position of the player's hand determined by the player hand position locator to give the player the sensation that the player is actually touching or feeling or interacting with a physical object in the player interaction zone in front of the player (or otherwise physically interacting with the display device or EGM).

FIGS. 4A, 4B, 4C and 4D illustrate an EGM 100 configured to provide contactless haptic feedback to a player. More specifically, referring to FIGS. 2 and 4A to 4D, the EGM 100 includes a player gesture tracking and recognition unit 110 including cameras positioned to the right and left of the EGM and configured to track or determine one or more positions of at least one of the player's hands in front of the display device, and a haptic feedback unit 140 including ultrasonic transducers or transducer arrays positioned above and below the display device and configured to provide tactile feedback to at least one of the player's hand based on the determined position of one or more of the player's hands. In these embodiments, the EGM 100 can use the ultrasonic transducers or transducer arrays to produce one or more sound waves that cause sensations in the player's hand in the player interaction zone at the position of the player's hand determined by the cameras positioned to the right and left of the display device on a real time or substantially real time basis to give the player the physical sensation that the player is actually touching or feeling or interacting with a physical object in the player interaction zone in front of the player (or otherwise physically interacting with the display device).

It should be appreciated that the first display device, the player eye/head position tracking unit 130, the gesture tracking/recognition unit 110, and the haptic feedback unit 140, may each be individually configured or may alternatively be configured to operate with the one or more processors and memory devices to provide each of their designated functions described herein. In other words, the first display device may be individually configured to display 3D or may be configured to operate with the one or more processors and memory devices to display the 3D images. The player eye/head position tracking unit 130 may be individually configured to track the movement of the eyes and/or head of the player or may be configured to operate with the one or more processors and memory devices to track the movement of the eyes and/or head of the player. The gesture tracking/recognition unit 110 may individually be configured to track the position of at least one of the player's hands or may be configured to operate with the one or more processors and memory devices to track the position of at least one of the player's hands, and the haptic feedback unit 140 may be individually configured to provide tactile feedback to at least one of the player's hands or may be configured to operate with one or more processors and memory devices to provide tactile feedback to at least one of the player's hands.

In some embodiments, the EGM 100 may be configured to provide the enhanced physical player interaction of the present disclosure by operating on a real time or substantially real time basis to: (a) cause the first display device 300 to display 3D images such that the player in front of the first display can see one or more virtual objects in a player interaction zone in front of the first display device or projecting toward the player; (b) determine movements of the player's eyes or head and cause the first display device to vary the display relating to the virtual object(s) in the player interaction zone based on such player eye or head movements; (c) determine the positions of one or more of the player's hands positioned in the player interaction zone in front of the display device; (d) determine or estimate the position(s) of the player's hand(s) relative to the apparent positions of the virtual objects displayed in the player interaction zone; and (e) enable the player to interact with the virtual objects in the player interaction zone in part by changing the display of the objects based on the position(s) of the player's hand(s) and in part based on causing a physical interaction with the player's hand(s) to occur in the player interaction zone at the position(s) of the virtual object(s), thus giving the player a sense that the player actually touched one or more of the virtual objects as if the virtual object(s) were physical objects floating in the player interaction zone.

In various embodiments, this physical interaction is provided by one or more choreographed haptic events that the player can physically feel or sense on an anatomical feature of the player, such as the player's hand(s) or finger(s). In various embodiments, the choreographed haptic event(s) include one or more sound waves directed at the player's hand(s) or finger(s) that provide the player a feeling or sensation that the player is actually touching the virtual object in the player interaction zone or otherwise interacting with the EGM without actually touching the EGM.

In various embodiments, primary display device 300 is configured to display or project what appears to the player as one or more 3D virtual objects that are projected towards the player or projected in the player interaction zone (such as the player interaction zone 310 shown in FIG. 4B) in front of the player 410. In various embodiments, the primary display device 300 is configured to display or project what appears to the player as one or more 3D virtual objects that appear to the player to be behind the front face or screen of the primary display device 300.

In some embodiments, the player interaction zone 310 extends in front of the display device 300 in a cone-like shape. However, it should be appreciated that in other embodiments, the player interaction zone can be alternatively configured, such as to extend: (a) from a horizontal plane level with a top edge of the display device to a horizontal plane level with a bottom edge of the display device; (b) from a vertical plane level with a right side edge of the display device to a vertical plane level with a left side edge of the display device; and (c) from a vertical plane from a front face of the display device to a vertical plane approximately twelve inches from the front surface of the display device. In other embodiments, the player interaction zone can be alternatively configured to extend: (a) from a horizontal plane level with the top edge of the display device to a horizontal plane level with the bottom edge of the display device; (b) from a vertical plane level with the right side edge of the display device to a vertical plane level with the left side edge of the display device; and (c) from a vertical plane from the front face of the display device to vertical plane approximately twelve inches from the front surface of the display device. It should thus be appreciated that the size and shape of the player interaction zone may vary according to design requirements.

It should also be appreciated that the size and shape of the player interaction zone may vary as the position of the player's eyes or head change in accordance with the present disclosure. In certain such embodiments, the far end of the cone is centered at the player's eyes or head, and when the player's eyes or head move, the player interaction zone changes.

It should also be appreciated that other suitable 3D or virtual object displaying systems or devices can be employed in accordance with the present disclosure.

The primary display device 300, the eye/head position tracking camera 320, the one or more processor(s), and the one or more memory device(s) operate to track the player's head movements in the eye/head tracking zone 312 in relation to the first display device 300 and the player interaction zone 310 and to adjust the display or projection of each of the virtual object(s) in the player interaction zone 310 based on the player's eye or head movements. In various embodiments, the primary display device 300 adjusts the images to be seen by the player's left and right eyes based on the determined position and movement of the player's eyes or head.

Figure 4A:
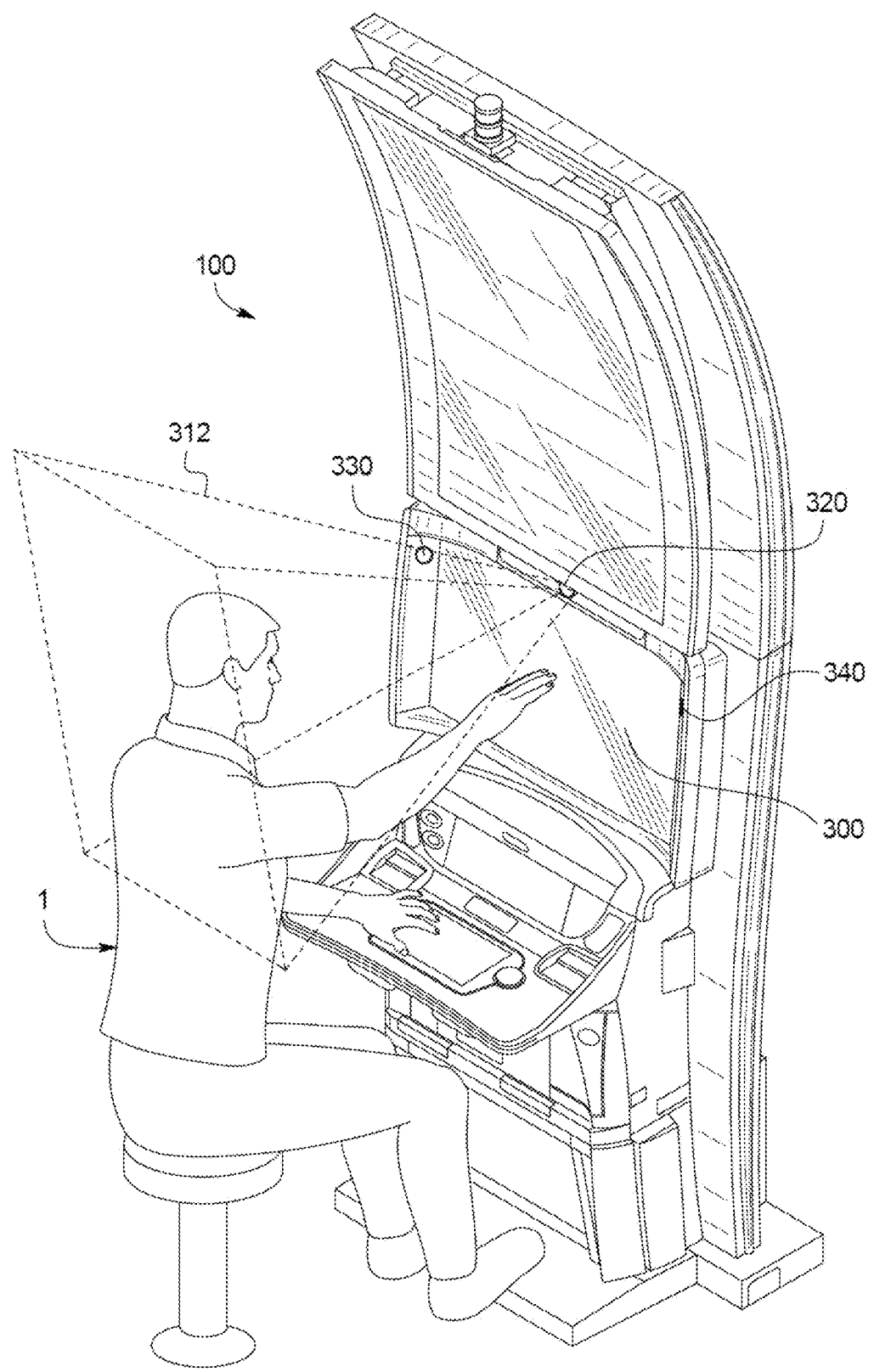
FIG. 4A is a front perspective view of the EGM of FIG. 1A, showing in phantom a player eye or head tracking zone provided by the EGM.
Figure 4B:
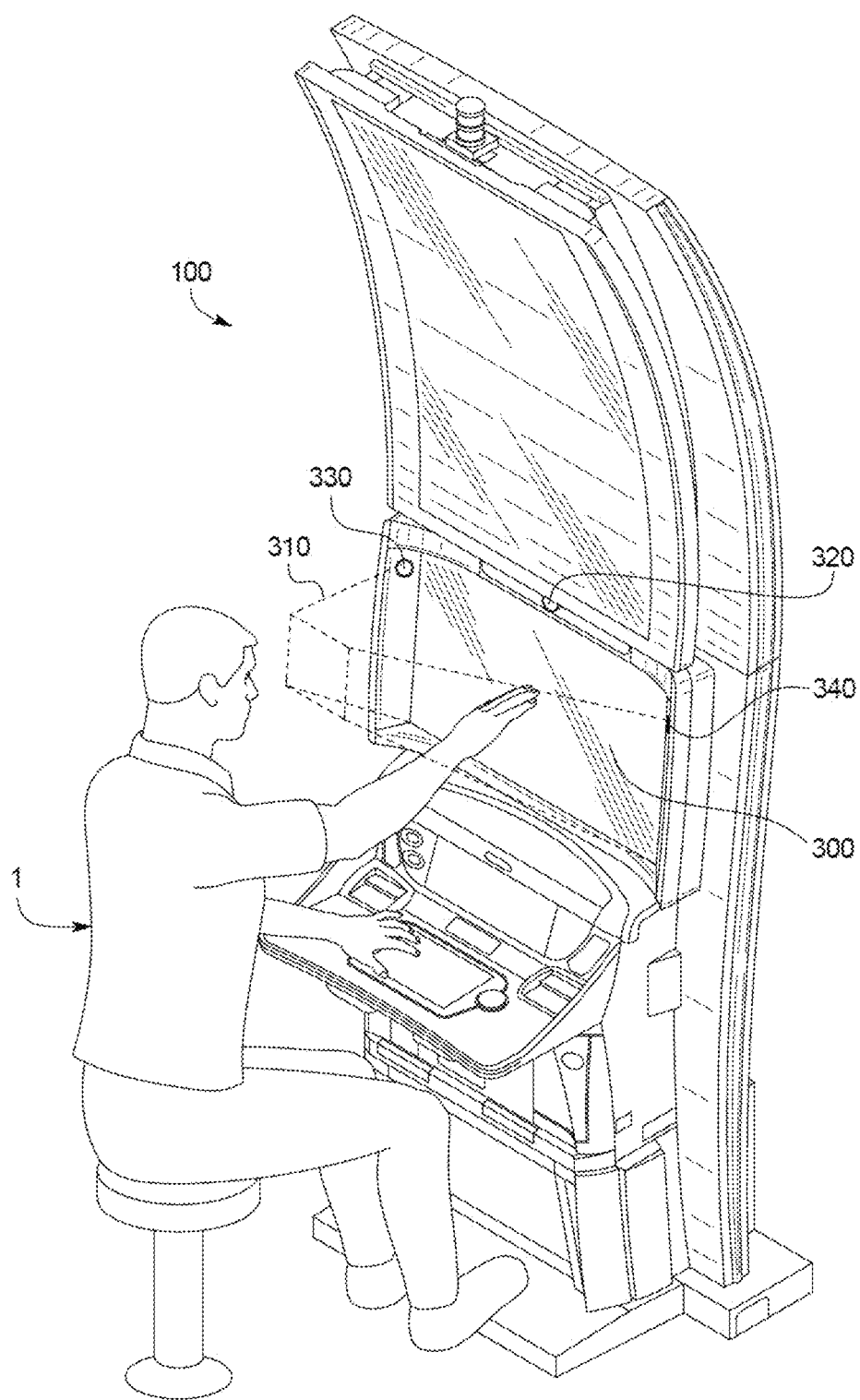
FIG. 4B is a front perspective view of the EGM of FIG. 1A, showing in phantom a player interactive zone provided by the EGM.
Figure 4C:
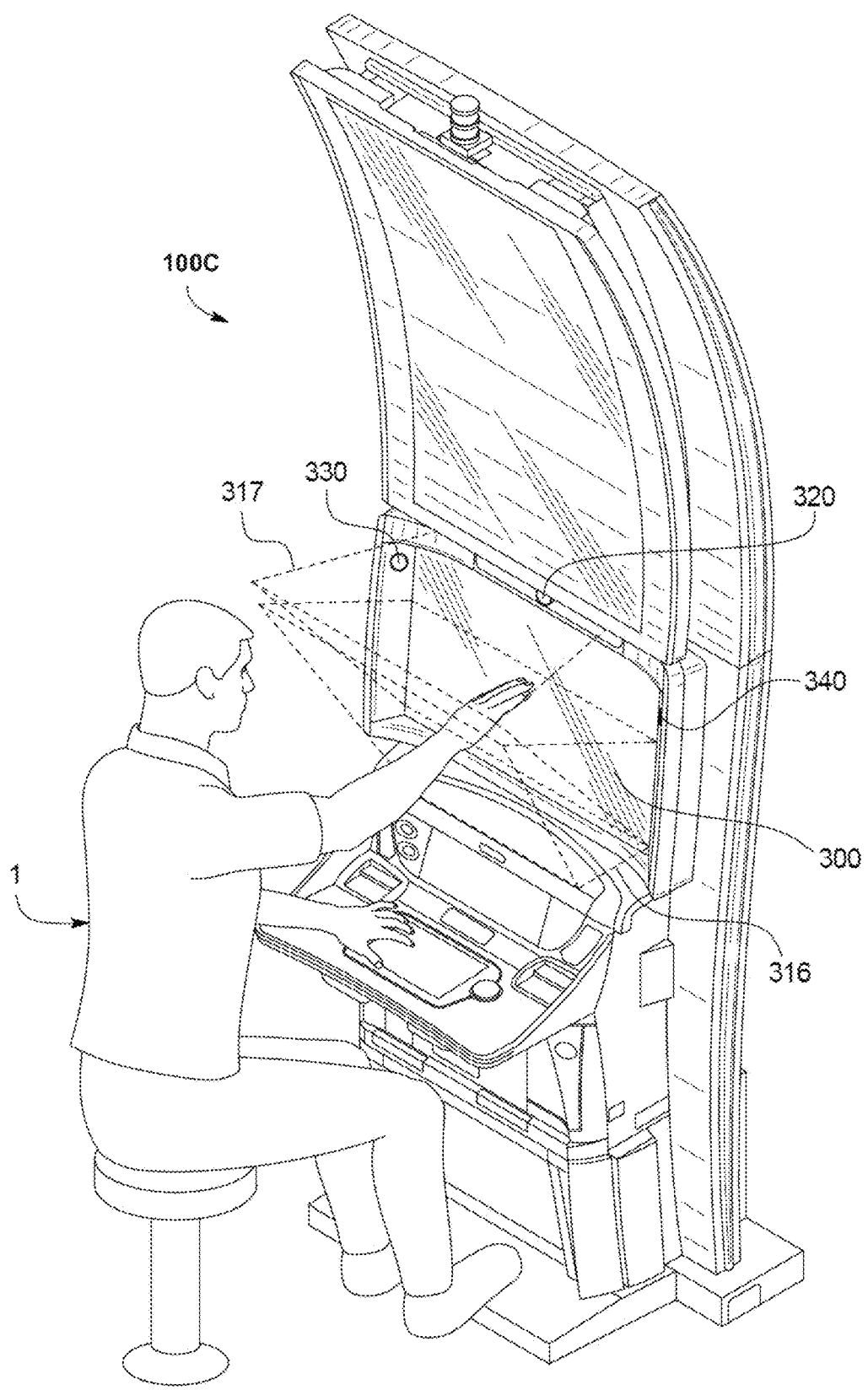
FIG. 4C is a front perspective view of the EGM of FIG. 1A, showing in phantom upper and lower player haptic or sensation zones provided by the EGM.
Figure 4D:
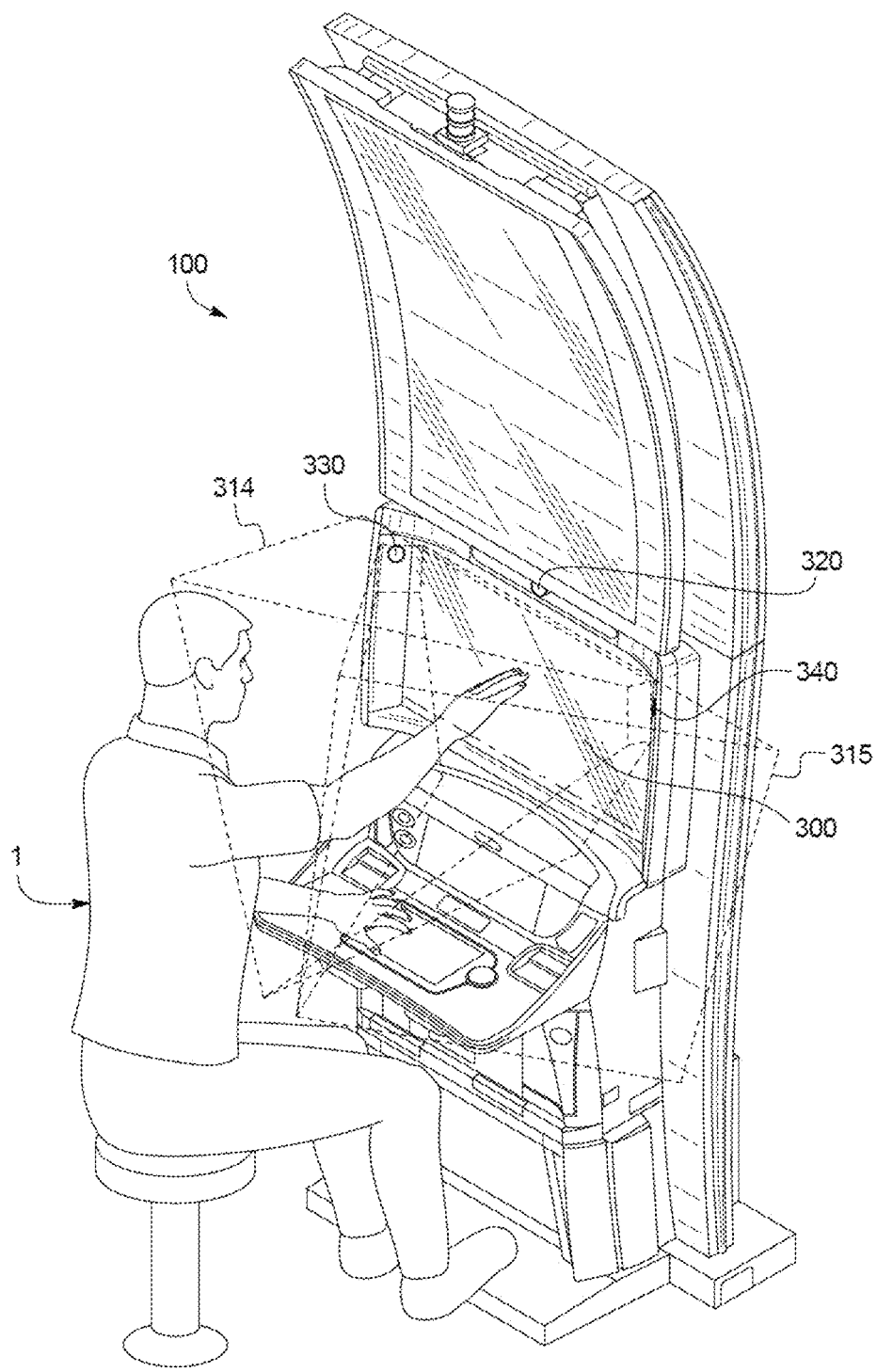
FIG. 4D is a front perspective view of the EGM of FIG. 1A, showing in phantom left and right player hand location zones provided by the EGM.

It should also be appreciated from the above and from FIG. 4B that in certain embodiments of the present disclosure, the player's head (and eyes) are expected to be outside of the player interaction zone 310.

In this illustrated example embodiment, the player gesture tracking/recognition unit 110 of the EGM 100 that is configured to track or determine the position(s) of at least one of the player's hands in front of the first display device 300 in the right and left player hand tracking zones 314 and 315 (shown in FIG. 4D) includes a plurality of cameras 330 and 340 supported by the cabinet 215 and positioned adjacent to the first display device 100. In this illustrated embodiment, one camera 330 is positioned directly to the right of the display device 300 (looking forward) and one camera 340 positioned directly to the left of the display device 300 (looking forward). In this illustrated embodiment, the plurality of cameras 330 and 340 are positioned adjacent to an upper right hand corner of the display device 300 and the other of the plurality of camera is positioned adjacent to an upper left hand corner of the display device 300. It should be appreciated that in an alternative embodiment, the plurality of cameras can be positioned adjacent to a lower right hand corner of the display device 300 and positioned adjacent to a lower left hand corner of the display device 300. It should be appreciated that in other alternative embodiments, the plurality of cameras can be otherwise alternatively positioned in accordance with the present disclosure. It should also be appreciated that in other alternative embodiments, the EGM can include only one such camera or more than two such cameras in accordance with the present disclosure. In various embodiments, the player hand position locator is configured to locate part of the player's hand, such as one or more fingers. In various embodiments, the player hand position locator is configured to simultaneously locate both of the player's hands or locate multiple parts of the player's hands, such as two or more fingers.

In various embodiments, the cameras 330 and 340 are or include time of flight depth camera sensors positioned at the two opposite sides of the display device 300 and focused inwardly somewhat towards each other. This configuration enables the cameras 330 and 340 to track objects, such as one or more of the player's hands in the relatively large right and left player hand tracking zones 314 and 315 (shown in FIG. 4D), respectively. These right and left player hand tracking zones 314 and 315 overlap the player interaction zone 310 (shown in FIG. 4B). In various embodiments, the time of flight depth camera sensors make the EGM less prone to occlusions. In various embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

In various embodiments, the EGM 100 uses the image data provided by the cameras 330 and 340 to determine the position(s) of the player's hand(s) in the right and left player hand tracking zones 314 and 315 and thus also in the player interaction zone 310. In certain embodiments, the EGM 100 creates the object depth images using point clouds provided by time of flight depth cameras and merges these point clouds to create one optimized point cloud that represents the object(s), such as the player's hand(s) in the right and left player hand tracking zones 314 and 315, and thus any portions thereof also in the player interaction zone 310 and relative to the display device 300. This provides a high degree of accuracy and a relatively large coverage area and player interaction zone (then would a one camera system). In these embodiments, the EGM 100 determines the position(s) of the object(s) such as the player's hand(s) in the player interaction zone 310, and uses the determined position(s) for providing the player haptic or tactile feedback to the player in real time or substantially real time.

Using these two cameras and keeping the camera resolution relatively low: (a) facilitates an increased size of the player interaction zone; and (b) reduces the need for high data rates and significant processing time or delays for image analysis that may slow down the EGM and prevent real time or substantially real time physical player feedback or sensation. Using these two cameras also better facilitates the tracking of multiple player hands.

In various other embodiments, the EGM 100 uses the image data provided by the cameras 330 and 340 to determine the closest depth of the end of the player's hand(s) such as the end of one of the player's fingers that is in the player interaction zone 310 closest to the display device 300. In other words, in these alternative embodiments, the EGM determines the nearest point (i.e., the xyz coordinate relative to the display device 300) of the object such as the player's hand to the display device 300, and then uses that point as the reference for providing the tactile feedback to the player in real time or substantially real time.

In various other embodiments, the EGM uses the image data provided by the cameras 330 and 340 to determine movements or gestures by the player's hand(s). In these embodiments, the EGM uses the determined gestures to provide the player tactile feedback to the player in real time or substantially real time.

In certain embodiments, the EGM includes one or more camera sync cables (not shown) that sync the multiple cameras 330 and 340 to enhance the accuracy of the determination of the position(s) of player's hand(s) in the right and left player hand tracking zones 314 and 315 and in the player interaction zone 310. It should be appreciated that the image data from the multiple cameras can be synced in other suitable manners in accordance with the present disclosure.

It should also be appreciated that other suitable player hand position locating systems or devices can be employed in accordance with the present disclosure.

For example, in various embodiments, the player hand position locator actually estimates the hand pose. The pose of the hand is not the position of the hand, but is instead the location and orientation of certain or every bone of the hand. In certain embodiments, the hand pose is determined by determining or specifying the 3D coordinates of a plurality of or every joint of the skeleton hand.

In this illustrated example embodiment, the haptic feedback unit 140 of the EGM 100 that is configured to provide tactile feedback to at least one of the player's hands includes a plurality of ultrasonic transducers or two arrays of ultrasonic transducers 360 and 370 supported by the cabinet 215 and positioned directly below and above the first display device 300, respectively. These ultrasonic transducers or ultrasonic transducer arrays 360 and 370 are configured to selectively produce and direct sound waves into lower and upper haptic zones 316 and 317 shown in FIG. 4C and in the player interaction zone 310 from below and above the first display device 300. The EGM 100 uses the ultrasonic transducers or ultrasonic transducer arrays 360 and 370 to produce and send the directed sound waves into the player interaction zone 310 at the determined position(s) of the player's hand(s) to cause the players' hand(s) to feel or sense one or more pulses or the sound waves produced by such devices on a real time or substantially real time basis.

In various embodiments, the EGM 100 uses the ultrasonic transducers or ultrasonic transducer arrays 360 and 370 to produce and send the directed sound waves into the player interaction zone 310 at the determined position(s) of the player's hand(s) when the player's hand(s) are at the same positions of one or more of the displayed virtual objects in the player interaction zone 310 such that the sound waves reaching the player's hand(s) at the positions provide the player the sensation that the player is actually touching, feeling, or interacting with one or more of the displayed virtual objects as if each such object was an actual physical object floating in the player interaction zone 310 in front of the player. This player sensation can occur when the player interacts with virtual object(s) apparently in midair in the player interaction zone 310. Thus, the EGM 100 can simulate a characteristic of one or more of the virtual objects the player appears to be interacting with. This provides one of the many different enhanced physical player interactions that can be provided by the EGM 100 in accordance with the present disclosure.

In various embodiments, the EGM 100 can cause the ultrasonic transducers or ultrasonic transducer arrays 360 and 370 to individually or jointly produce and send continuous, regular, interrupted, directed, or individual sound waves into the areas of the player interaction zone 310 at the determined positions of the player's hand(s) to cause the players' hand(s) to feel such sound waves. In various embodiments, the EGM 100 can cause the ultrasonic transducers or ultrasonic transducer arrays 360 and 370 to vary the intensity of the sound waves into the areas of the player interaction zone 310 at the determined positions of the player's hand(s) to cause the players' hand(s) to feel different sensations.

The EGM 100 can cause the ultrasonic transducers or ultrasonic transducer arrays 360 and 370 to produce and send such different sound waves or sound wave patterns directed to: (a) the positions in the player interaction zone 310 where the player's hand(s) is closest to the display device 300; (b) the positions in the player interaction zone 310 which are where the entire player's hand(s) are at; (c) the positions in the player interaction zone 310 which are where the player's arm(s) is or are at; or (d) any combination of these positions in the player interaction zone 310.

In various embodiments, at the same time or slightly after the EGM creates the physical interaction with the player's hand(s) in the player interaction zone 310, the EGM can cause the display device 300 to alter the image(s) including the virtual object(s) in the player interaction zone 310. This can be used to show one or more responses of the virtual object(s) or other displayed image(s) to the interaction with the player's hand(s).

Thus, in various embodiments, the EGM 100 captures the player's hand(s) or finger(s) midair location coordinates while performing a movement in the player interaction zone 310 in real-time, provides haptic sensation to the player's hand(s) or finger(s) at these coordinates in the player interaction zone 310 with no or little lag time, and can additionally alter the displayed virtual object(s) in real time.

In various embodiments, the EGM 100 maps one or more of the player's hand(s) into the virtual environment displayed by the primary display device 300 and/or into the player interaction zone 310. In certain such embodiments, the primary display device 300 can display part of one or more of the player's hand(s) on the primary display device 300 or as a virtual object to further enhance the player interaction.

In the illustrated example embodiment of the EGM 100 of the present disclosure shown in FIGS. 1 to 4D, the cameras 330 and 340 of the player hand position locator of the EGM 100 are positioned directly to the right and left of first display device 300, and the ultrasonic transducers or ultrasonic transducer arrays 360 and 370 are positioned directly below and above the first display device 300. It should be appreciated that in an alternative embodiment of the present disclosure, the cameras 330 and 340 of the player hand position locator of the EGM 100 are positioned directly below and above the first display device 300, and the ultrasonic transducers or ultrasonic transducers arrays 360 and 370 are positioned directly to the right and left of the first display device 300. It should further be appreciated that in an alternative embodiment of the present disclosure, the cameras of the player hand position locator of the EGM 100 are positioned directly below and above the first display device, and the ultrasonic transducers or ultrasonic transducer arrays are also positioned directly below and above the first display device. It should further be appreciated that in an alternative embodiment, the cameras of the player hand position locator of the EGM are positioned directly to the right and left of the first display device, and the ultrasonic transducers or ultrasonic transducer arrays are positioned directly to the right and left of the first display device. It should further be appreciated that in alternative embodiments of the present disclosure, the ultrasonic transducers or ultrasonic transducer arrays are positioned directly to the right and left of the first display device and directly above and below the first display device or suitable combinations thereof.

In the illustrated example embodiment, the processor(s) and memory device(s) of the EGM 100 operate together to provide the enhanced physical player interaction with the EGM 100 and incorporate the player's hand(s) into one or more of the games provided by the EGM 100 or other functionality provided by the EGM 100. For example, the displayed or projected virtual object(s) can be part of a game that enables or requires the player to interact with the object(s) as part of the play of the game.

It should be appreciated that the player tactile feedback provider can in alternative embodiments provide feedback to the player's hand(s) outside of the player interaction zone in accordance with the present disclosure, but in certain such embodiments, the player would not see virtual objects outside of such player interaction zone.

It should also be appreciated that certain other suitable player tactile feedback providing systems or devices can be employed in accordance with the present disclosure.

It should be appreciated from the above that in various embodiments, the EGM 100 can provide the enhanced physical player interaction in conjunction with game play or other functionality provided by the EGM to the player. For example, the EGM can provide interaction with: (a) one or more fingertips of the player interacting in midair in the player interaction zone that enables the player to make inputs such as drawing letters, symbols, or other images with controlled sensational feedback; or (b) one hand or two hands of the player interacting in midair in the player interaction zone the player to make inputs such as drawing letters, symbols, or other images with controlled sensational feedback.

In various embodiments, the EGM can provide the enhanced physical player interaction in conjunction with other functionality provided by the EGM to the player. For example, the EGM can display virtual images of a series of drinks in the player interaction zone and enable to player to select one of the virtual images. When the player positions the player's hand at the position of the selected drink, the EGM can use the ultrasonic transducers or ultrasonic transducer arrays to provide feedback or sensation to the player's hand indicating that that drink has been selected by the player.

In various embodiments, the EGM includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

In various embodiments, a sound chair is associated with the EGM and includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

Figure 5A:
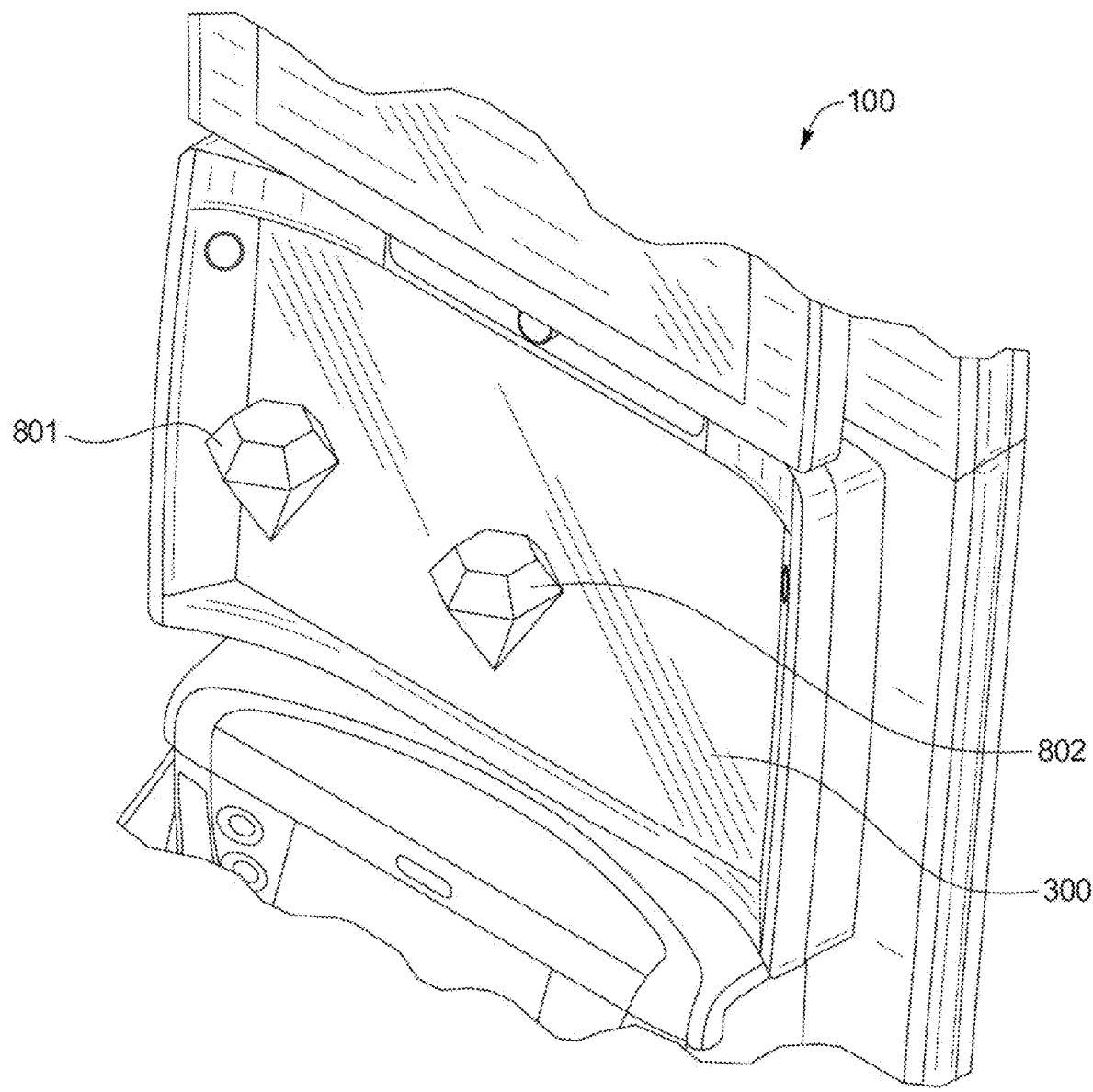
FIG. 5A is an enlarged fragmentary front perspective view of the central portion of the EGM of FIG. 1A.
Figure 5B:
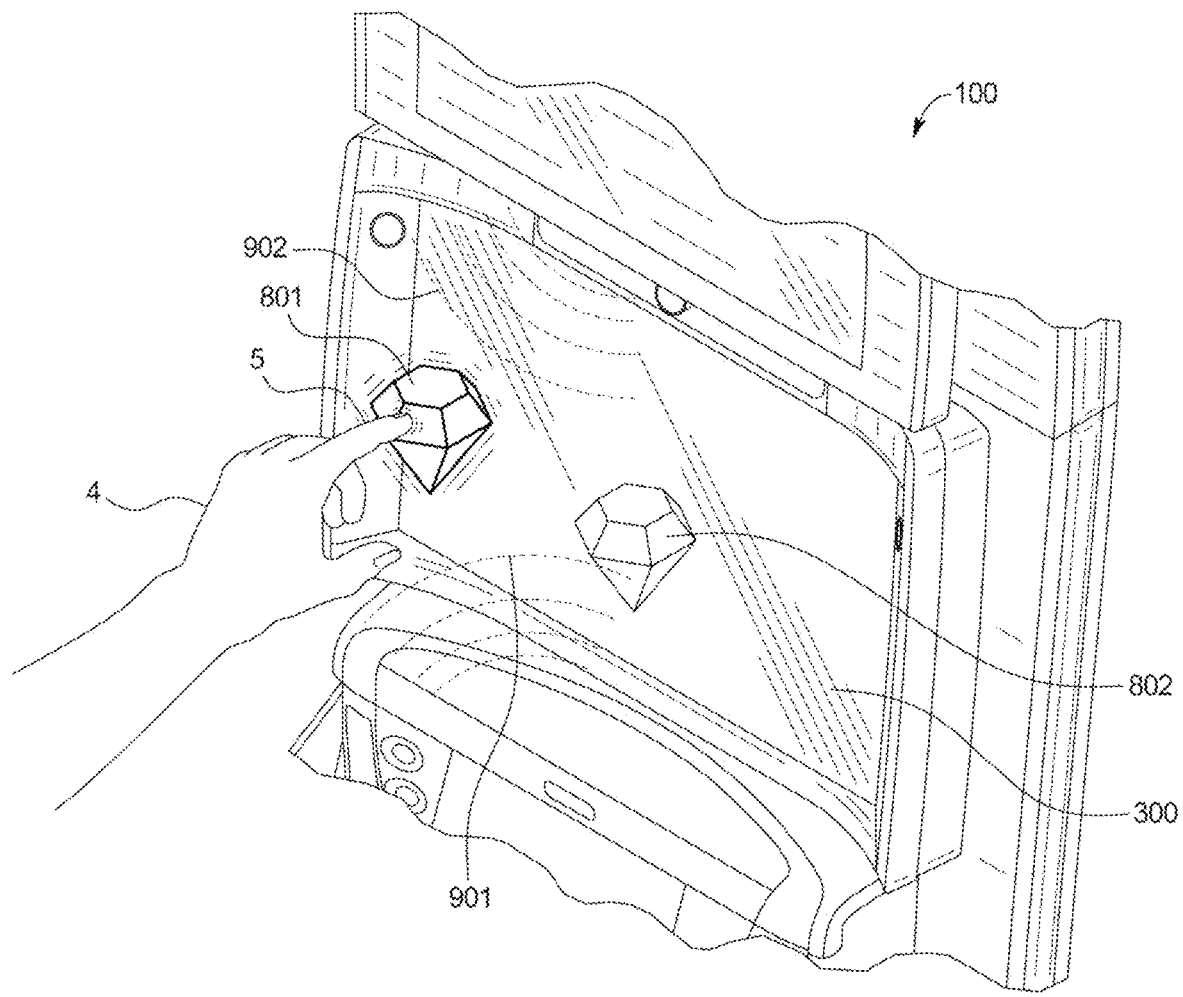
FIG. 5B is an enlarged fragmentary front perspective view of the central portion of the EGM of FIG. 1A.

FIGS. 5A and 5B illustrate the use of contactless haptic feedback. FIG. 5A shows the EGM 100 displaying, in three dimensions, two player selectable virtual objects 801 and 802 in the player interaction zone in front of the primary display device 300. The virtual objects illustrated in FIGS. 5A and 5B are gems; however, the virtual objects could be any virtual items or game components, such as cards, tiles, reels, etc. It will be appreciated that these objects 801 and 802 are not real, but rather what a player would see looking at the first display device 300.

The virtual objects 801 and 802 are displayed, or rendered, to have apparent three-dimensional positions in space. The three-dimensional positions of the virtual objects 801, 802 may be defined according to the objects' position in a coordinate system, such as a Cartesian coordinate system. In particular, each of the virtual objects 801, 802 may have an associated position vector in a three-dimensional coordinate system.

FIG. 5B shows the EGM 100 displaying in three-dimensional space the two virtual objects 801 and 802 in front of the display device 100, a player's hand 4, and in particular a player's finger 5, touching one of the virtual objects 801. When the EGM 100 detects, using the gesture tracking/recognition unit 110, that the player's hand or finger is located in three-dimensional space where the virtual object 801 is displayed within the player interaction zone 310, the EGM 100 may determine that the player's finger or hand is touching the virtual object 801. The EGM 100 may then activate the haptic feedback function to cause ultrasonic transducer arrays 360 and 370 to generate ultrasonic waves 901, 902 (shown in phantom).

Accordingly, the player's hand 4 may be subject to ultrasonic waves 901 and 902 that cause the player to feel one or more sensations of the player touching the object 801. This is an example of how the EGM 100 can be used to provide a selection game, such as a bonus selection game, where the player selects one or more virtual objects to obtain awards. In various embodiments, the touching of the virtual object may cause the appearance of the virtual object(s) to move or otherwise change as indicated by the lines indicating the movement of object 801 when "touched" by the player finger 5.

Decomposition of Displayed Elements with Gaze Detection

As described above, some embodiments of the present inventive concepts utilize gaze detection capabilities of an EGM as a trigger for displaying information or additional information to a user or player of the EGM.

Figure 6A:
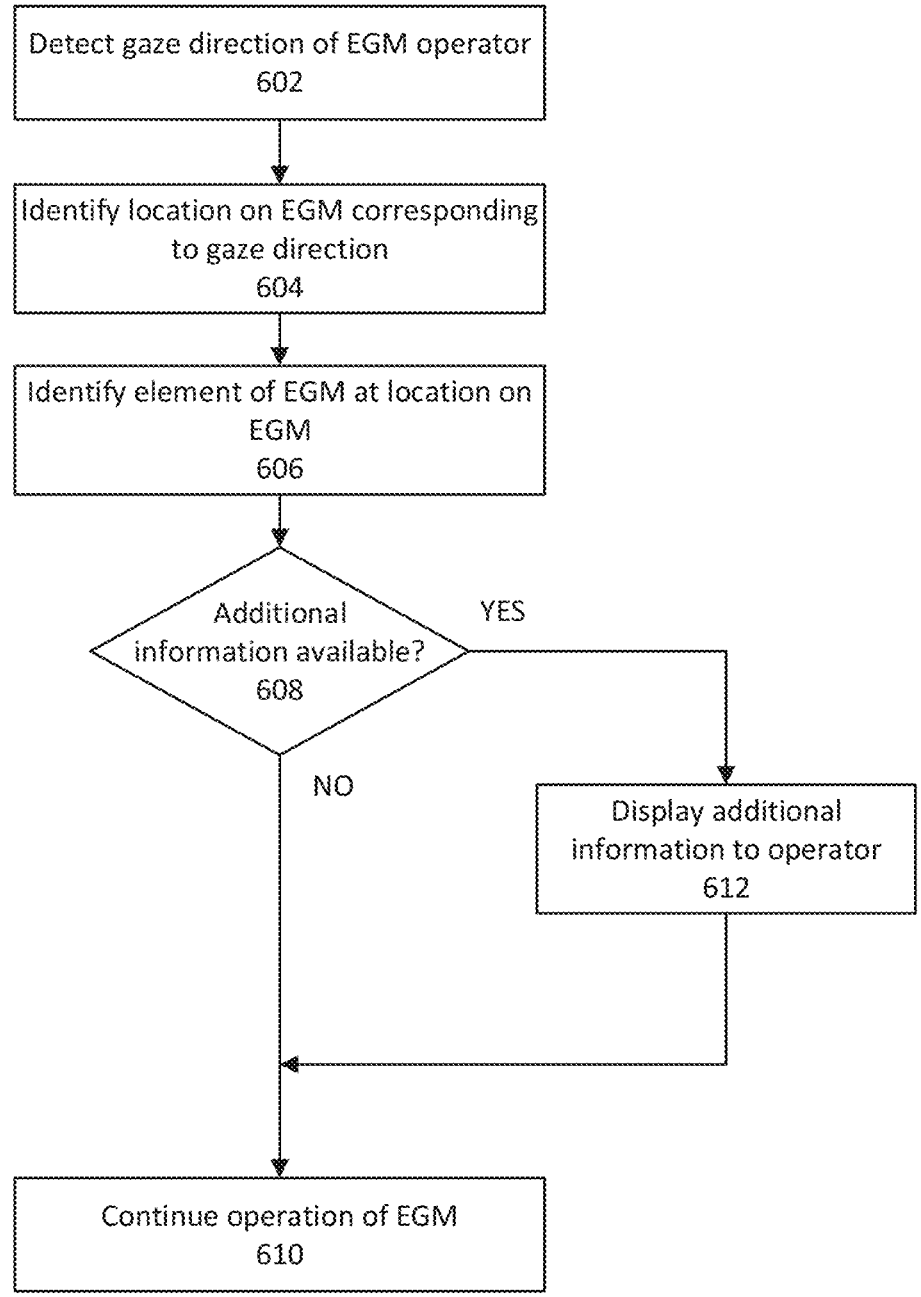
FIG. 6A is a flowchart illustrating operations of an EGM according to some embodiments.

In particular, referring to FIG. 6A, some embodiments provide a method of operating an electronic gaming machine that includes detecting a gaze direction of an operator of the electronic gaming machine (block 602), identifying a location on the electronic gaming machine towards which the gaze of the operator is directed (block 604), identifying an element of the electronic gaming machine corresponding to the location on the electronic gaming machine towards which the gaze of the operator is directed (block 606), determining if additional information regarding the identified element is available (block 608), and displaying the additional information on a display device that is visible to the operator (block 612). After the additional information has been displayed, or if no additional information is available, operation of the EGM 100 continues at block 610.

Figure 6B:
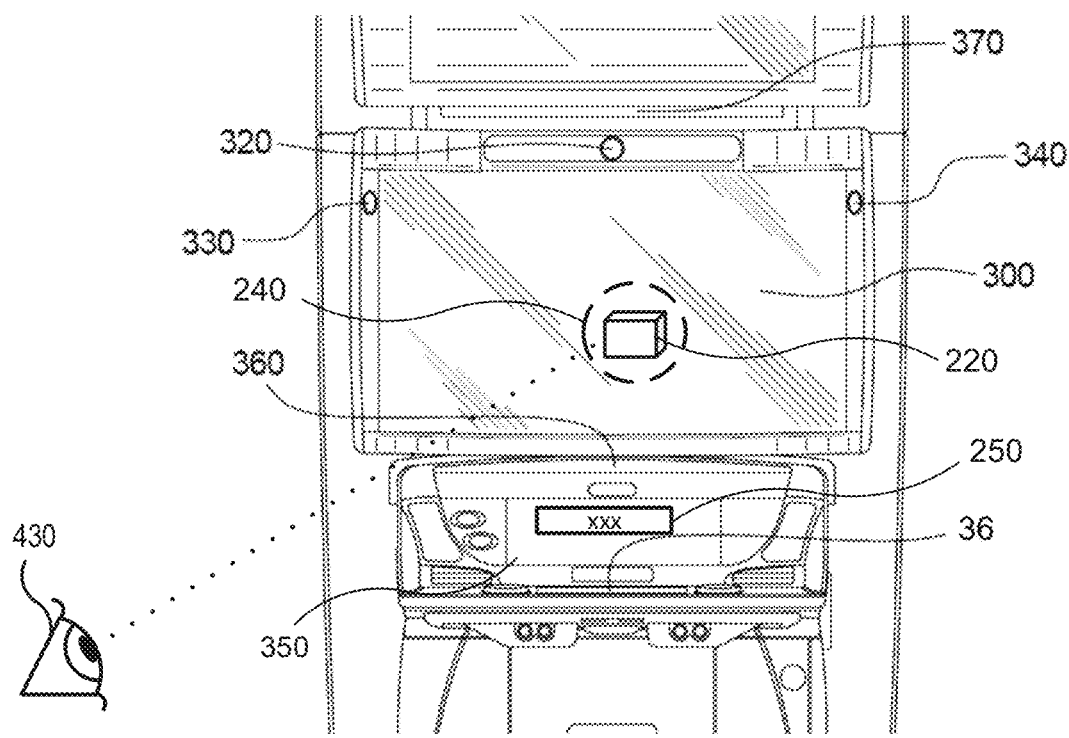
FIG. 6B is a front perspective view of a portion of an EGM according to some embodiments.

For example, referring to FIG. 6B, an EGM 100 may, using the gaze detection unit 120, determine that the gaze of a player's eye 430 is directed at a location 240 on the primary display screen 300 of an EGM 100. The EGM 100 determines that an element 220, which may be a game component or other item displayed on the screen, is being displayed at a location that corresponds to the location 240 to which the player's gaze is directed. The element 220 shown in FIG. 6B is arbitrary, and may be any type of displayable item.

In some embodiments, the element 220 that the player is looking at may be a physical feature or attribute of the EGM 100, such as an input button, a card reader, a ticket acceptor, or any other physical or mechanical feature of the electronic gaming machine.

In response to determining, based on gaze detection data provided by the gaze detection unit 120, that the player is looking at the element 220, the EGM 100 determines if any additional information about the element 220 is stored, for example in the data store 57. If so, the EGM 100 may display the additional information to the player, such as by displaying the additional information in a display window 250 on the information display device 350.

Figure 7:
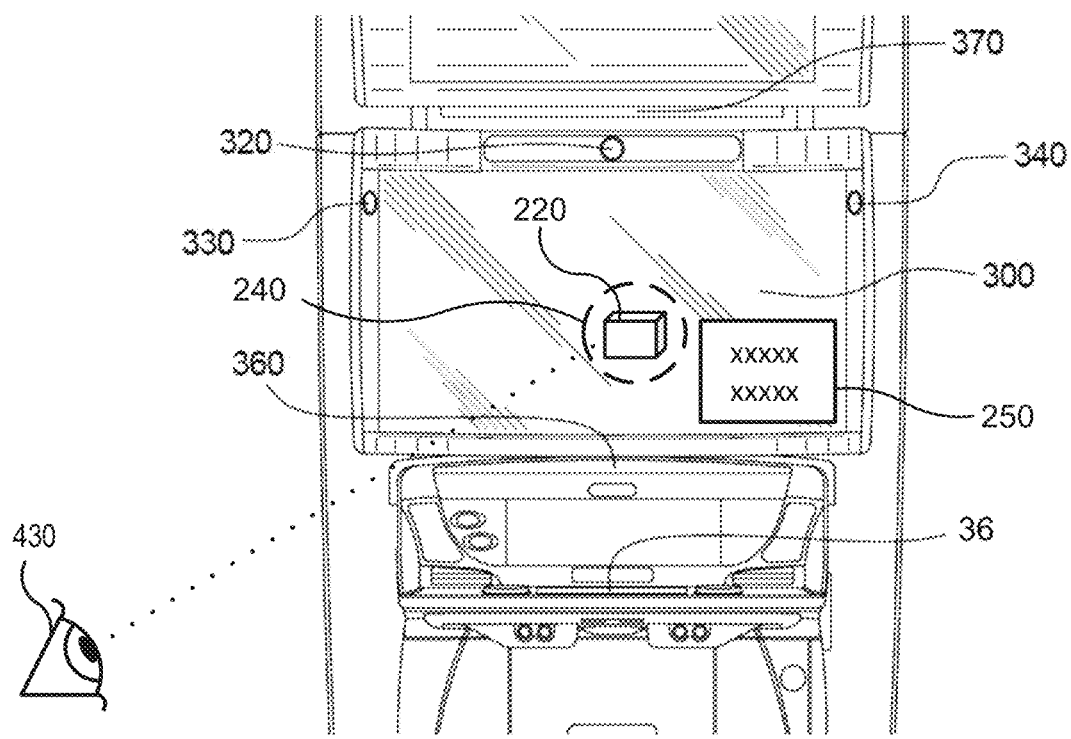
FIG. 7 is a front perspective view of a portion of an EGM according to some embodiments.

Referring to FIG. 7, in some embodiments, the additional information may be displayed in a display window 250 on the primary display device 300. The primary display device 300 may display the window 250 as a two-dimensional or three-dimensional object.

In addition, in some embodiments, the element may 220 may be displayed as a three-dimensional object on the primary display device 300. The additional information may be displayed as a three-dimensional window object 250 that replaces the element 220 in the view, i.e., the window 250 may be displayed over, in front of, or instead of the element 220.

In further embodiments, the gesture tracking/recognition unit 110 may be employed to enable the player to interact with the additional information. For example, in some embodiments, the additional information may be displayed, or removed, based on a gesture by the user. When the gaze detection unit 120 detects that the user is looking at an element 220, the gesture tracking/recognition unit 110 may be activated to track a hand of the player to determine if the player touches the element 220. In that case, the EGM 100 may display the additional information on a display screen. The player may be instructed by the EGM 100 to look at and touch any item on the EGM 100, including physical features of the EGM 100 or virtual items displayed by the EGM 100.

The user may cause the EGM 100 to stop displaying the additional information by touching the item again or by touching a window displaying the additional information, with such touch being detected by the gesture tracking/recognition unit 110.

Figure 8:
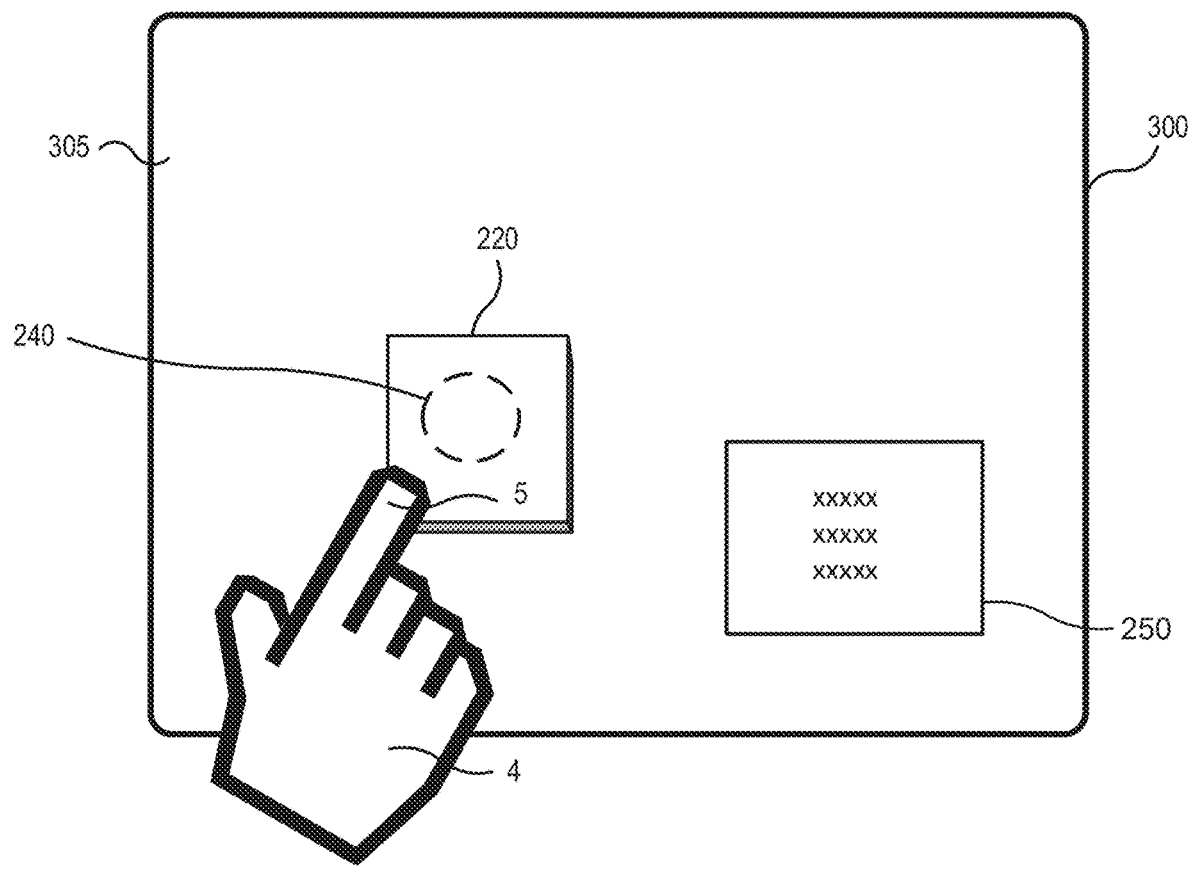
FIGS. 8, 9, 10A, 10B, 11, 12A, 12B are schematic views of a primary display screen of an EGM according to some embodiments.

In some embodiments, the element of the electronic gaming machine may include a three-dimensional element displayed by the three-dimensional display device having an apparent spatial position, such as illustrated in FIG. 8. As shown therein, an element 220 is displayed by a primary display device 300. The gaze detection unit 120 determines that the user's gaze is directed at a location 240 that corresponds to the location of the element 220. When the user "touches" the element 240 with the user's hand 4 or, or more particularly the user's finger 5, the EGM 100 may cause additional information about the element 220 to be displayed, for example, in a pop up window 250 on the primary display device 300.

Accordingly, a method according to some embodiments may include detecting a location of at least one portion of a hand 4 of the operator, determining if the location of the at least one portion of the hand 4 of the operator corresponds to the apparent spatial position of the three-dimensional element 220, and displaying the additional information 250 in response to the gaze direction 240 of the operator and the location of the at least one portion of the hand 4 of the operator.

Figure 9:
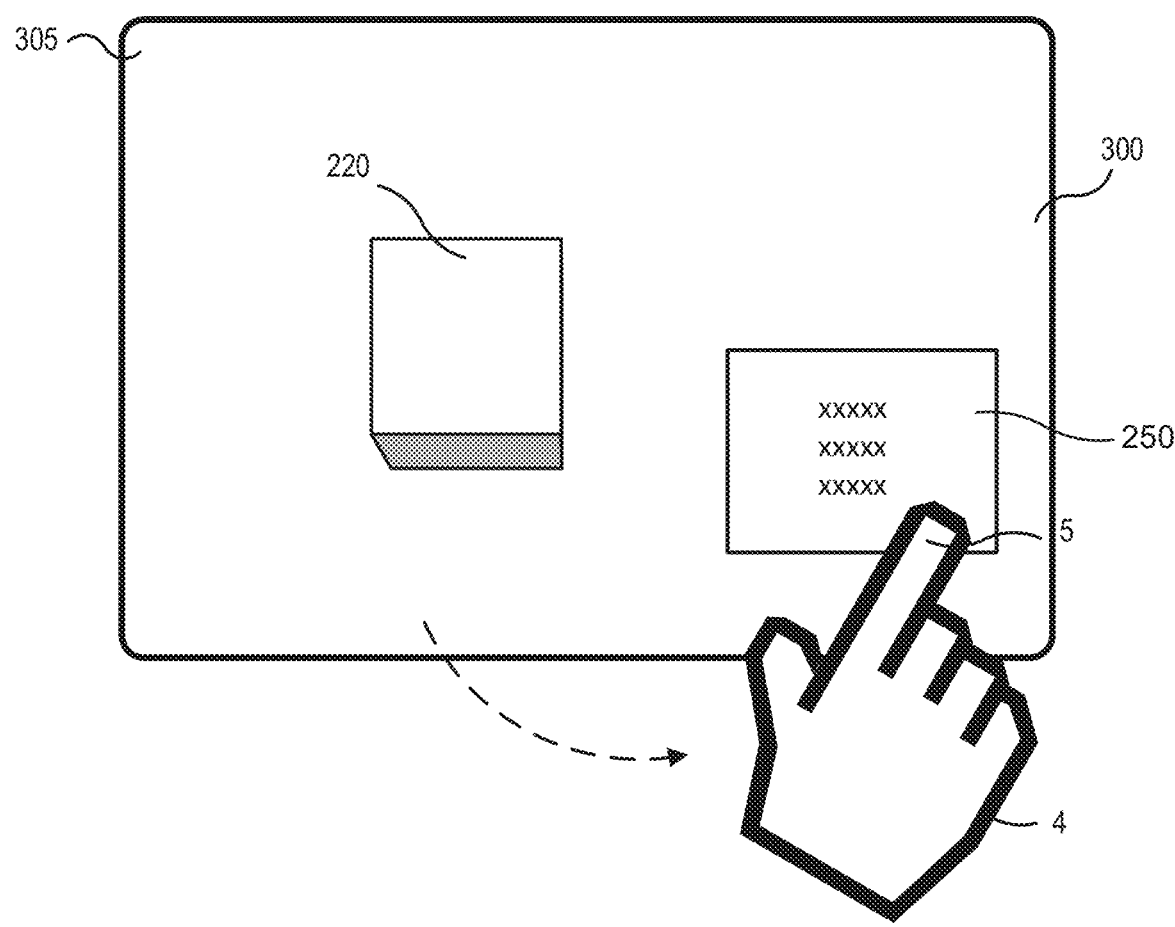

In some embodiments, the user may cause the EGM 100 to stop displaying the additional information by touching the additional information window. For example, referring to FIG. 9, after the additional information window 250 has been displayed, the user may move his or her hand 4 so that a portion of the user's hand 4, such as the user's finger 5, "touches" the additional information window 250. The gesture tracking/recognition unit 110 may detect the location of the user's hand 4, and may remove the additional information window 250 that displays the additional information in response.

In some cases, the EGM 100 may display, or remove, the additional information window in response to detecting, by the gesture tracking/recognition unit 110, a "selection" gesture, such as the user pushing or poking toward the element 220 or the additional information window 250 while the user is looking at the element 220 or the additional information window 250 as determined by gaze detection data provided by the gaze detection unit 120. Accordingly, the methods may further include detecting a selection gesture by the user, and displaying or removing the additional information in response to the selection gesture and the location of at least one portion of the hand of the operator.

In some embodiments, after determining that the user is looking at an element, the EGM 100 may display additional information about the element in response to a further triggering event or condition. The further triggering event or condition may include that (a) the player has looked at the item for a certain amount of time uninterrupted, (b) the player has looked at the item for a certain amount of time over a given period of time, (c) the player has looked at the item a certain number of times over a given period of time, (d) the player has looked at the item after looking at another item and/or (e) the player has looked at the item for a certain amount of time or number of times per game cycle.

In some embodiments, the method may further include starting a timer in response to identifying the element of the EGM 100 corresponding to the location on the electronic gaming machine towards which the gaze of the operator is directed, the additional information may be displayed in response to the timer exceeding a predetermined threshold while the operator's gaze continues be directed toward the identified element.

The element of the electronic gaming machine may include an information item that is a composite of sub-information items that are not displayed with the information item, and wherein the additional information may include the sub-information items that compose the information item.

For example, broadly stated, some embodiments of the inventive concepts determine that the player is looking at a particular information element that is displayed by the EGM 100, decompose that element into meaningful sub-elements, and display the sub-elements instead of or in addition to the element based on user gaze. This may provide additional information for a player, operator or regulator using the EGM 100. In this context, "decomposition" may be described as breaking down the information or showing additional information.

The decomposition information may be presented as a box or window of information. More complicated display might include additional content, images, text and sounds.

Figure 10A:

As an example, a player of the EGM 100 that provides a virtual slot game may win a prize that is based on a number of paylines of the virtual slot game that are winners. The total win may be displayed to the player as shown in FIG. 10A, which illustrates a display device 300 of an EGM 100 displaying an information box 425 to the player indicating a win of $1500. However, the amount won may be based on a combination of several outcomes, including multiple winning paylines and one or more bonus games.

Figure 10B:

In response to determining that the player is looking at the information box based on the detected gaze location 240, and, optionally, the fulfillment of at least one additional condition, the EGM 100 may display an additional information box 435 with decomposed information content to the player as shown in FIG. 10B. Upon the detection that the player is looking at the win meter the $1,500 can be decomposed into $1000 for 3 boat symbols, $250 for 3 cherry symbols and $250 from free spins. This information can overlay, replace or pop-up adjacent the original information box 425.

Upon gaze detection the win meter shows the win values that it represents. For example if the player win meter shows 250 credits the game could break that down in 150 for a 3 cherry win plus 100 for a scatter win. The breakdown could include progressive, paytable, bonus or other wins. A more elaborate break down could show the actual images of 3 cherries and the scatter symbols for the win. It will be appreciated that the decomposed information may be presented in many different forms with or without additional graphics, animations or the like.

Decomposition of game information may be of interest to users other than players. For example, in a service or audit mode, information about a game, player, the machine or other aspect of the EGM 100 may be displayed using decomposition, such as to an operator or regulator. For example, for the regulator or operator, a decomposition of a win meter could show when (date and time stamp) the outcome happened for history or game recall.

The numerical decomposition provided to a user could include, for example, paytable wins, bonus wins, host initiated wins (such as mystery jackpot, lucky coin, etc.), progressive jackpot wins, etc. A progressive jackpot value might decompose into previous wins, time of win and names of player winning the progressive jackpot. The decomposition might also indicate additional information about the progressive jackpot, such as the rate at which the progressive is growing, the statistical "overdue" metric and whether or not the current bet (or other game parameter) is eligible to win the progressive value.

In some embodiments, a Credit Meter may decompose in response to a user's gaze. Like the win meter, any meter showing money entering the machine could decompose based on a user's gaze direction into additional information, such as the source of the money (ticket, coin, bill, money transfer, mobile device) and time of the transfer.

Figure 11:
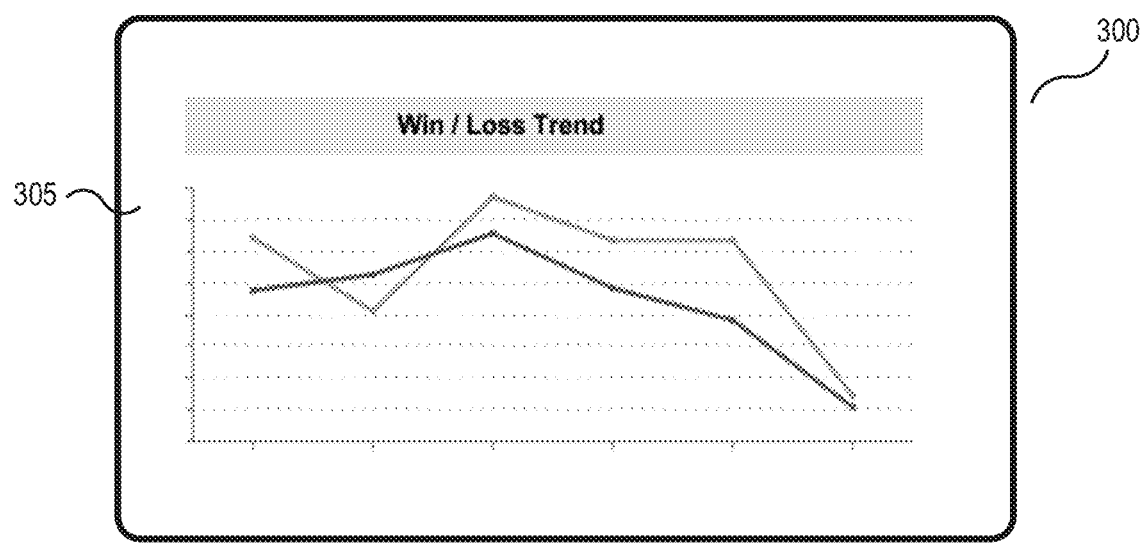

The decomposition could break the Credit Meter down into cashable credits, non-cashable credits and promotional credits. In some embodiments, the Credit Meter could decompose into a win/loss graph showing the how each previous game added or removed from the credit meter. A trend could be displayed or determined from the graph, as illustrated in FIG. 11.

A Paid Meter shows when money leaves the EGM 100. Based on a user's gaze, the decomposition of the Paid Meter could show how the money left the machine (e.g., as a ticket, bill, attendant, EFT, coin), when (date and time) it left and why (player initiated cashout, host initiated cashout, malfunction of a device such as an extra coin paid from the hopper).

The additional information may include current information about a game being played on the electronic gaming machine and/or historical information about previous games played on the electronic gaming machine. A historical decomposition may show the player what previous values or states of the EGM 100 were. It may also show the player how a particular state or value came to be by showing the steps or previous states that preceded the particular state or value.

The historical information could include one or more of event times, player decisions or choices, decisions from other players in a communal game, previous values, previous states, such as previous card or dice plays, player loyalty points awarded, identity of player logged into EGM when the even occurred, player login/loyalty card information, etc. In some embodiments, the EGM may play one or more sounds that are associated with the event, such as the win sound or sound associated with a player choice.

For example, when the player looks at a progressive meter the EGM 100 may display an additional information box with historical information about the EGM 100, such as the last win amounts and dates.

As a further example in the context of a video poker machine that displays a paytable based on poker hands, when the player looks at the a particular line of the paytable, such as the royal flush line, the EGM 100 may display historical information indicating the last time a royal flush was hit on the EGM 100.

As a still further example, in one embodiment when the player looks at a slice during a video wheel game, the EGM 100 may display one or more of the time since last time the slice was hit, and the player who last hit the slice.

This historical information could in some embodiments include player information about a player of the EGM 100 for promotional, management or audit purposes. Such information may include player name, location, player picture, avatar, etc. As an example, when a user looks at a progressive jackpot meter, the EGM 100 may display an additional information window indicating who last hit the jackpot and where they were located.

When the player looks at a game component on the EGM 100, such as a baccarat element, the EGM 100 may display the previous game values as additional information, as it is very common for baccarat players to bet based on the historical outcomes. Similarly, the last double up outcomes might be shown to the player to help them decide which double up option to take.

When the player looks at a particular game element the EGM 100 may display as addition information which choices the player made that led to this outcome. For example, a game element could show a Monopoly board and the current player location on that board. If the player looks at their avatar on the Monopoly board, the EGM 100 may show the previous dice rolls that resulted in the current location of the player avatar on the board.

Decomposed information may be shown for security or audit purposes. For example, the operator might want to know which player won which values in a dispute. Knowing when the outcome happen, which players were playing and who was logged into the EGM 100 at the time (player login, mobile login, loyalty card present), may help resolve disputes in a more timely fashion.

Information Decomposition

This type of decomposition shows the player additional information that might not be obvious or not needed until player interest is detected. In many electronic casino games, there are certain payouts that are not active until the player places a large enough bet. For example, on a reel slot machine that has a minimum bet of $0.25, there may be certain paylines that are not active until the player has bet at least $1.00 on the spin.

If the EGM 100 detects that the player is looking at a possible win value, the EGM 100 could determine if the player is betting enough to win that value, and, if not, the EGM 100 may display additional information to the player indicating how much the player needs to bet to win the amount in question. For example, if the player is looking at a large progressive value but isn't betting enough (e.g. max bet) to win that value, the EGM 100 may display an additional information window indicating that the player needs to bet the max bet to win the large progressive.

Similarly, some games, such as video poker, show the paytable on the screen for the player to see before and during game play. Before the player initiates the game, the EGM 100 may detect that the player is looking at the paytable. Based on the player's gaze, the EGM 100 may display an additional information window to the player with additional information about the particular item on the paytable the player was looking at.

Figure 12A:
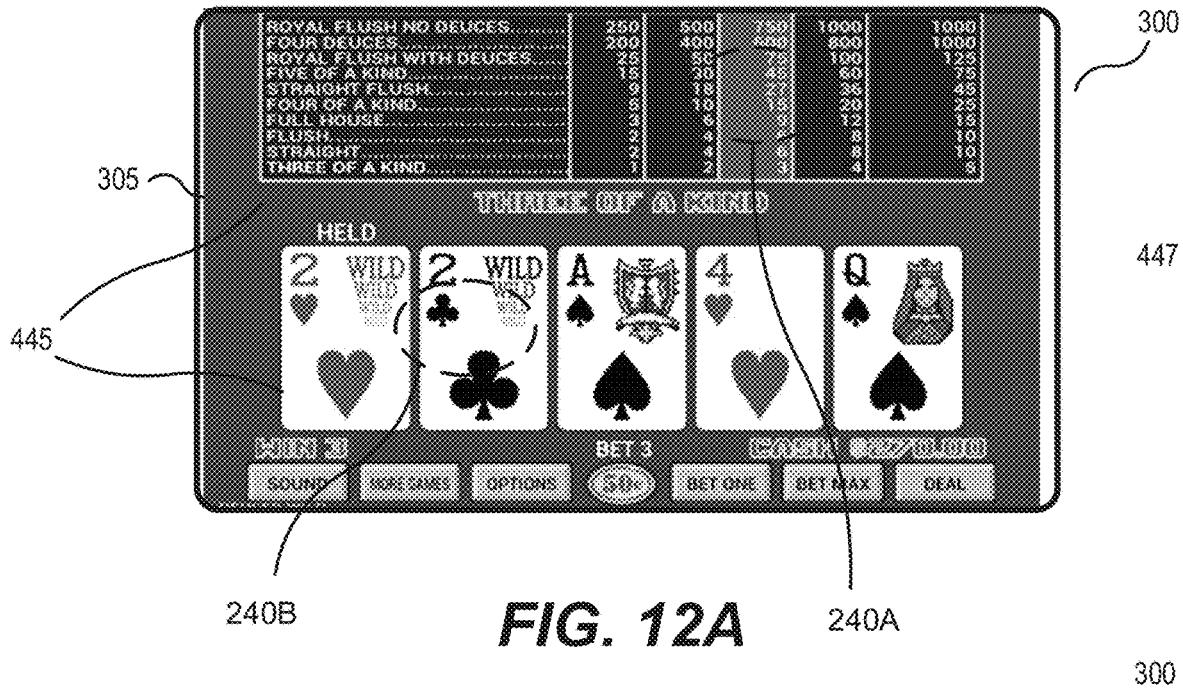
Figure 12B:
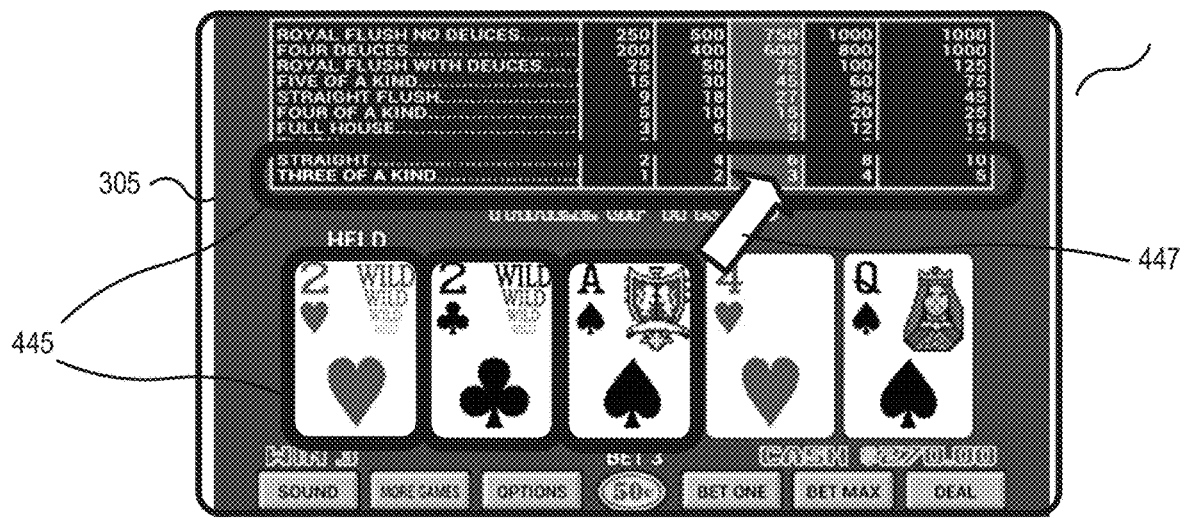

After a game is over, the EGM 100 displays a graphic indicating whether the player has won or lost, and how many credits were won. Based on the player's gaze, the EGM 100 may determine that the player may be confused as to why they won or lost, and/or how much the player won. For example, referring to FIG. 12A, if in a video poker game, the player's gaze moves to a first location 240A corresponding the paytable then to a second location 240B corresponding to the card hand repeatedly, the EGM 100 may conclude that the player is trying to figure out why the outcome was a win or loss, or otherwise has questions about the outcome of the previous game. The EGM 100 can provide additional information to the player by showing graphical information linking the card hand to the paytable. For example, as shown in FIG. 12B, the EGM may display, as additional decomposed information, boxes 445 around the winning cards and the winning payline, as well as an arrow 447 linking the winning cards to the winning payline.

The triggering condition for displaying information about a win or loss may include for example, a number of times or frequency the player looks at the paytable after the game, the length of time the player looks at the paytable, the number of times or frequency the player looks at the game components (e.g., cards) after the game, the length of time the player looks at the paytable, the number or frequency of times the player's gaze transitions between the game components and the paytable, etc. For example the poker game shown could show a prompt explaining the win if the player looks at the card hard and paytable twice after a win or loss.

Figure 13:
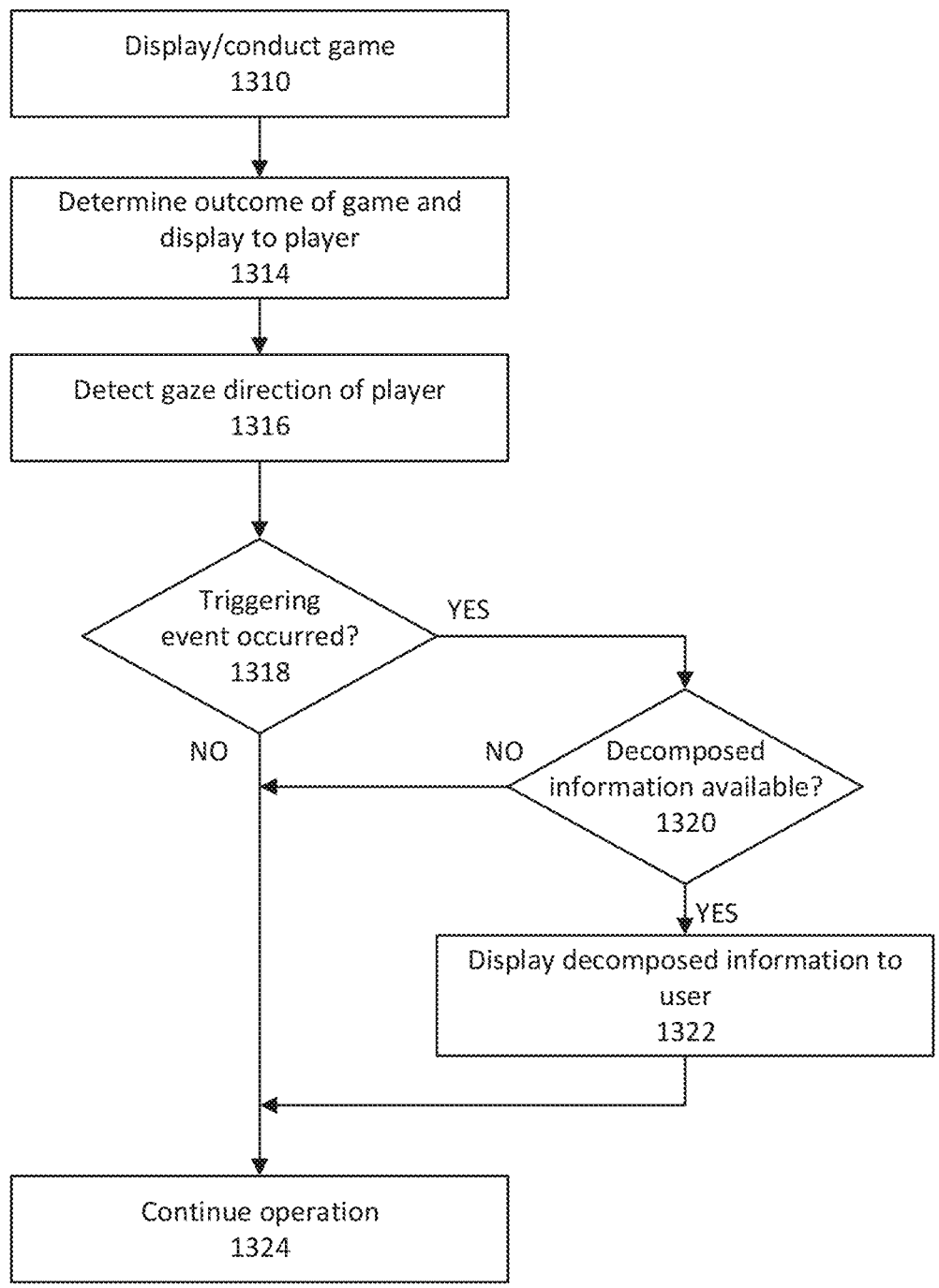
FIGS. 13 and 14 are flowcharts illustrating operations of an EGM according to some embodiments.

Triggering events and decompositions are illustrated, for example, in the flowchart of FIG. 13. As shown therein, an EGM 100 may display/conduct a game in response to player input, such as by pressing a "bet" button (block 1310). After the game has played, the EGM 100 determines the outcome of the game (block 1314), and displays the outcome to the player. After the outcome has been displayed, the EGM 100 detects the gaze direction of the player (1316). The EGM 100 then determines if a triggering event has occurred that would trigger the EGM 100 to display additional decomposed information to the player (block 1318). For example, the triggering event may include that (a) the player has looked at the item for a certain amount of time uninterrupted, (b) the player has looked at the item for a certain amount of time over a given period of time, (c) the player has looked at the item a certain number of times over a given period of time, (d) the player has looked at the item after looking at another item and/or (e) the player has looked at the item for a certain amount of time or number of times per game cycle.

If a triggering event has occurred, operations proceed to block 1320, where the EGM 100 determines if there is any decomposed information that can be displayed to the player based on the triggering event. If so, the EGM displays the decomposed information to the player (block 1322). Otherwise, operations proceed to block 1324, and the EGM 100 continues operation.

Figure 14:
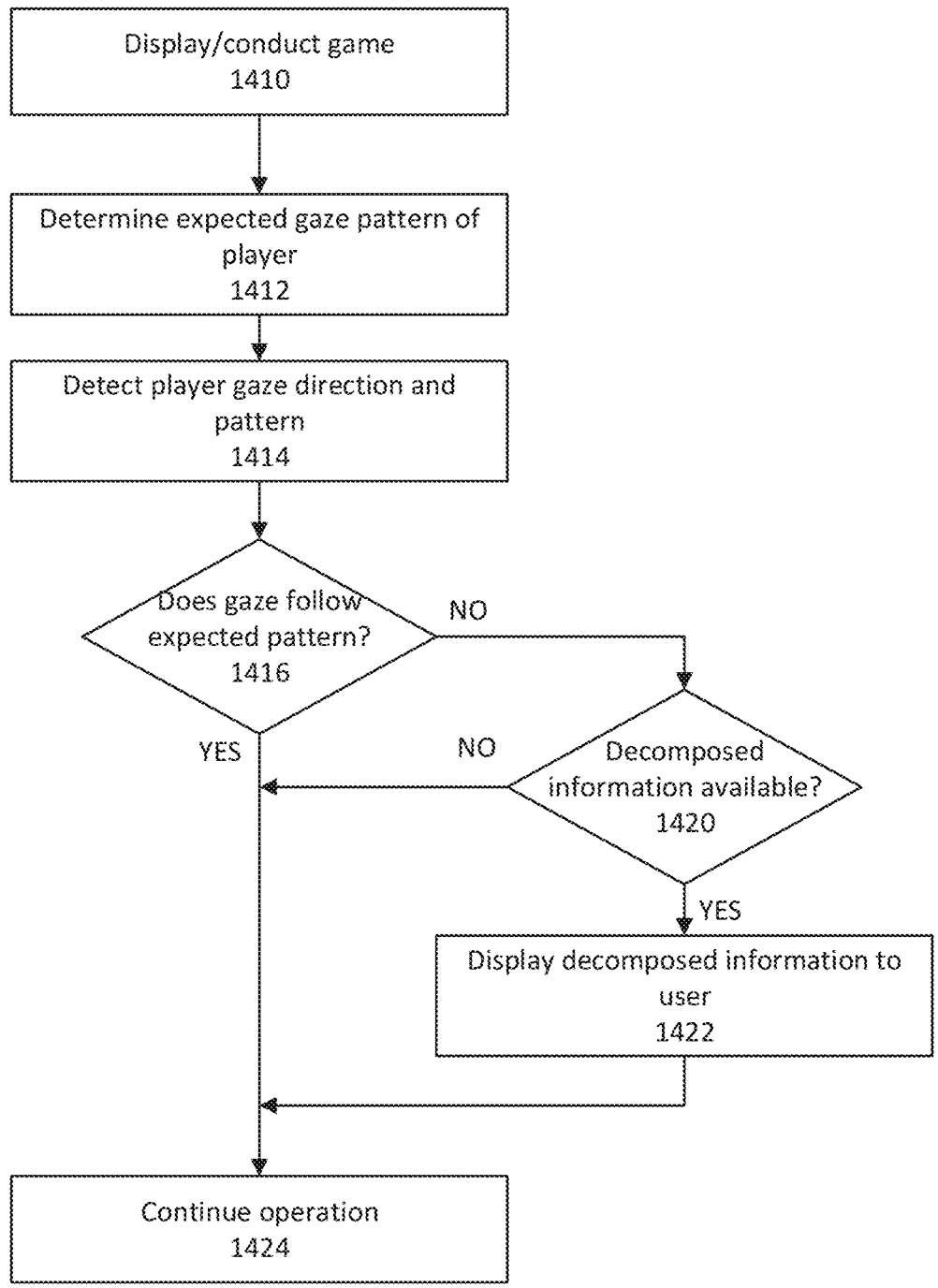

In some cases, the display of additional information as decomposed information may be based on whether a player's gaze follows an expected or predicted pattern. If the player's gaze does not follow an expected or predicted pattern, the EGM 100 may determine that the player is confused or has questions about some aspect of game play, and may display any additional information to the player in response. For example, referring to FIG. 14, the EGM 100 may display/conduct a game (block 1410). Before, during or after the game, the EGM 100 may determine an expected gaze pattern of the player (block 1412). The expected gaze pattern of the player may be determined based on an average of other players' gaze patterns, a pre-determined gaze pattern, or the current player's previous gaze pattern, or a combination of any of the foregoing.

The EGM 100 detects the player's gaze pattern, including the location of the player's gaze and the direction, speed and/or frequency of travel of the player's gaze (block 1414), and determines if the player's gaze follows an expected pattern (block 1416). If the EGM determines that the player's gaze does not follow an expected pattern, operations proceed to block 1420, where the EGM 100 determines if there is any decomposed information that can be displayed to the player based on the triggering event. If so, the EGM 100 displays the decomposed information to the player (block 1422). Otherwise, operations proceed to block 1424, and the EGM 100 continues operation.

As an example, after a win, the player may be expected to look at the win total, and then at the winning combination of game elements, and then at the bet button. If the player's gaze does not follow this pattern after a win, the EGM 100 may display additional decomposed information to the player about the win.

Game Elements and Evaluation

In some embodiments, the gaze decomposition may show how a game evaluation was performed. For example, slot games have wild or other substitution symbols. When the player looks at the wild or substitution symbol the EGM 100 may show which symbol was substituted. Gaze may also be used to show the order in which the player picked values in a pick bonus, or why a particular element is not available. For example, a bonus might have an option only available from a higher bet level or from a higher level triggering the bonus from the base game.

Communal games may show avatars or names from various players in the game. Gaze decomposition according to some embodiments may be used to show additional information about an opposing player, such as total win, previous choices, name, win/loss ratio, etc.

Gaze decomposition information may include a clue or information about one or more future events in the game. For example, looking at an item in the game may show values, states, animations, choices that are coming up for the player.

A player may be interested in the odds of hitting certain paytable wins or game elements. Gaze decomposition may show the player the odds of hitting a particular paytable win, or game element such as the odds of getting a royal flush, hitting the progressive, hitting a wheel slice, etc.

Slot games have a hierarchy of symbols, i.e., some symbols on a reel are better than others. When a player looks at a symbol the EGM 100 may show where in the hierarchy this symbol lands or show the entire hierarchy of symbols for the current game.

If the slot game art is in a foreign language, the decomposition could translate the art into the player's language with a pop up or overlay. This could be used as a method for localizing games quickly or to localize for every language possible without the need to create art for every language.

Triggering and Cycling

As described above, a player's gaze direction and/or gaze pattern may trigger a display to decompose into additional information. The triggering may involve various algorithms using gaze, such as (1) the player has looked at the item for a certain amount of time uninterrupted; (2) the player has looked at the item for a certain amount of time over a given period of time; (3) the player has looked at the item a certain number of times over a given period of time (4) the player has looked at the item after looking at another item and/or (5) the player has looked at the item for a certain amount of time or number of times per game cycle.

The logic for triggering could also be inverted. For example, the EGM 100 may begin the decomposition behavior when the player is not looking at the item or has not looked at the item enough. This might be used as a game design element to get the player to look at certain values.

The information shown during decomposition may cycle through values instead of showing one value. For example, a game could cycle a meter between credits and dollar amounts.

Security

Decomposition of game information in response to gaze detection may be used for security enhancement. For example, in some embodiments, the EGM 100 may display security warnings to reflect (1) if any of the security doors are open, (2) if there was recently a power restart, (3) when the EGM will stop operating (e.g., for the lottery market) and/or (4) if there are any non-cashable credits on the credit meter.

When the EGM 100 detects that an operator is looking the icon, the EGM 100 may show information about when the door was opened, who opened it, whether there was a player playing at that time, etc.

Game State

The triggering of the decomposition may be based on the game state. For example, the decomposition of win meter may only occur at game idle (when the game is over and not playing). Similarly, the historical decomposition may be displayed only in certain game states or game modes.

Media Display Service Window

Some embodiments may be used to display elements in a service window of an EGM 100. For example, decomposition may be used when showing the number of player loyalty points.

Hearing Impaired and Subtitles

Some embodiments may take into account when the player is hearing impaired and/or when the game volume is muted (or below some threshold) and show additional information based on the player's gaze. For example if there is a movie playing with voice audio, the EGM 100 may display subtitles below the animation if it is determined, such as by information in a player profile associated with a loyalty account, that the player is hearing impaired.

Further Definitions

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method of operating an electronic gaming machine, comprising:
    detecting a gaze direction of an operator of the electronic gaming machine;
    identifying a location on the electronic gaming machine towards which the gaze of the operator is directed;
    identifying an element of the electronic gaming machine corresponding to the location on the electronic gaming machine towards which the gaze of the operator is directed;
    determining that additional information regarding the element is available; and
    displaying the additional information as a three-dimensional element on a three-dimensional display device that is visible to the operator,
    wherein the element comprises a three-dimensional object displayed by the display device, and
    wherein displaying the additional information comprises displaying the additional information as a three-dimensional object in front of the element.

2. A method of operating an electronic gaming machine, comprising:
    detecting a gaze direction of an operator of the electronic gaming machine;
    identifying a location on the electronic gaming machine towards which the gaze of the operator is directed;
    identifying a first element of the electronic gaming machine corresponding to the location on a first display device of the electronic gaming machine towards which the gaze of the operator is directed, wherein the first display device comprises a first three-dimensional display device, and wherein the first element of the electronic gaming machine comprises a three-dimensional element displayed by the first three-dimensional display device as having an apparent spatial position;
    determining that additional information regarding the first element is available;
    detecting a location of at least a portion of a hand of the operator;
    determining that the location of the at least one portion of the hand of the operator corresponds to the apparent spatial position of the three-dimensional element; and
    displaying the additional information on a second display device that is separate from the first display device and visible to the operator in response to the location of the at least one portion of the hand of the operator corresponding to the apparent spatial position of the three-dimensional element.

3. The method of claim 2, further comprising:
    after identifying the first element of the electronic gaming machine, determining if at least one other condition has been fulfilled,
    wherein displaying the additional information is performed only after the at least one other condition has been fulfilled.

4. The method of claim 2, wherein the first element of the electronic gaming machine comprises an item displayed on the first three-dimensional display device.

5. The method of claim 2, wherein the first element of the electronic gaming machine comprises an information item that is based on a combination of sub-information items that are hidden from the operator, and wherein the additional information comprises the sub-information items.

6. The method of claim 2, wherein the additional information comprises one selected from the group consisting of current information about a game being played on the electronic gaming machine and historical information about previous games played on the electronic gaming machine.

7. The method of claim 2, further comprising:
    starting a timer in response to identifying the first element, wherein displaying the additional information is performed in response to the timer exceeding a predetermined threshold while the operator's gaze continues be directed toward the first element.

8. The method of claim 2, further comprising:
    determining a number of times within a predetermined time period that the operator's gaze is directed toward the first element,
    wherein displaying the additional information is performed in response to the number of times within the predetermined time period that the operator's gaze is directed toward the first element exceeding a predetermined threshold value.

9. The method of claim 2, wherein the first element comprises a second element, the method further comprising:
    determining that the operator's gaze was directed toward first element prior to being directed toward the second element,
    wherein displaying the additional information is performed in response to the operator's gaze being directed to the first element followed by the second element.

10. A method of operating an electronic gaming machine, comprising:
    detecting a gaze direction of an operator of the electronic gaming machine;
    identifying a location on the electronic gaming machine towards which the gaze of the operator is directed;
    identifying a first element of the electronic gaming machine corresponding to the location on a first display device of the electronic gaming machine towards which the gaze of the operator is directed;
    determining that additional information regarding the first element is available; and
    displaying the additional information as a three-dimensional element having an apparent spatial position on a three-dimensional display device that is separate from the first display device and visible to the operator;
    detecting a location of at least a portion of a hand of the operator;
    determining that the location of the at least one portion of the hand of the operator corresponds to the apparent spatial position of the three-dimensional element; and
    removing the three-dimensional element that displays the additional information in response to the location of the at least one portion of the hand of the operator corresponding to the apparent spatial location of the three-dimensional element.

11. The method of claim 10, further comprising:
    after identifying the first element of the electronic gaming machine, determining if at least one other condition has been fulfilled,
    wherein displaying the additional information is performed only after the at least one other condition has been fulfilled.

12. The method of claim 10, wherein the first element of the electronic gaming machine comprises an item displayed on the first three-dimensional display device.

13. The method of claim 10, wherein the first element of the electronic gaming machine comprises an information item that is based on a combination of sub-information items that are hidden from the operator, and wherein the additional information comprises the sub-information items.

14. The method of claim 10, further comprising detecting a selection gesture by the operator, wherein removing the three dimensional element is performed in response to the selection gesture and the location of the at least one portion of the hand of the operator corresponding to the apparent spatial location of the three-dimensional element.

15. The method of claim 10, wherein the additional information comprises one selected from the group consisting of current information about a game being played on the electronic gaming machine and historical information about previous games played on the electronic gaming machine.

16. The method of claim 10, further comprising:
starting a timer in response to identifying the first element, wherein displaying the additional information is performed in response to the timer exceeding a predetermined threshold while the operator's gaze continues be directed toward the first element.

17. The method of claim 10, further comprising:
determining a number of times within a predetermined time period that the operator's gaze is directed toward the first element,
wherein displaying the additional information is performed in response to the number of times within the predetermined time period that the operator's gaze is directed toward the first element exceeding a predetermined threshold value.

18. The method of claim 10, wherein the first element comprises a second element, the method further comprising:
determining that the operator's gaze was directed toward first element prior to being directed toward the second element,
wherein displaying the additional information is performed in response to the operator's gaze being directed to the first element followed by the second element.

19. An electronic gaming machine, comprising:
a processor;
a three-dimensional display device;
a display controller coupled to the processor and the three-dimensional display device; and
a gaze detection unit coupled to the processor and configured to detect a gaze direction of the viewer,
wherein the processor is configured to:
detect a gaze direction of an operator of the electronic gaming machine;
identify a location on the electronic gaming machine towards which the gaze of the operator is directed;
identify a first three-dimensional object displayed by the three-dimensional display device corresponding to the location indicated by the gaze direction;
determine that additional information regarding the first three-dimensional object is available; and
responsive to identifying the first three-dimensional object and determining that additional information regarding the first three-dimensional object is available, displaying the additional information as a second three-dimensional object on the three-dimensional display device in front of the first three-dimensional object.

20. The electronic gaming machine of claim 19, wherein the processor is further configured to:
after identifying the first three-dimensional object, determine if at least one other condition has been fulfilled,
wherein the processor is configured to display the additional information only after the at least one other condition has been fulfilled.

21. The electronic gaming machine of claim 19, wherein the three-dimensional display device comprises a first display device and a second display device,
wherein displaying the additional information comprises displaying the additional information on the first display device, and
wherein the first three-dimensional object comprises an item displayed on the second display device that is separate from the first display device.

22. The electronic gaming machine of claim 19, wherein displaying the additional information comprises displaying the second three-dimensional object instead of the first three-dimensional object.

23. An electronic gaming machine, comprising:
a processor;
a three-dimensional display device;
a display controller coupled to the processor and the display device; and
a gaze detection unit coupled to the processor,
wherein the processor is configured to:
detect a gaze direction of an operator of the electronic gaming machine using the gaze detection unit;
identify a first location on the three-dimensional display device towards which the gaze of the operator is directed;
identify a first three-dimensional element displayed by the three-dimensional display device corresponding to the first location indicated by the gaze direction, the first three-dimensional element having an apparent spatial position;
determine that additional information regarding the first three-dimensional element is available;
detect a second location of at least a portion of a hand of the operator;
determine that the second location corresponds to the apparent spatial position of the first three-dimensional element;
responsive to determining that additional information regarding the first three-dimensional element is available and that the second location of the at least the portion of the hand of the operator corresponds to the apparent spatial position of the first three-dimensional element, display the additional information as a second three-dimensional element on the three-dimensional display device.

24. The electronic gaming machine of claim 23, wherein the processor is further configured to:
after identifying the first three-dimensional object, determine if at least one other condition has been fulfilled,
wherein the processor is configured to display the additional information only after the at least one other condition has been fulfilled.

25. The electronic gaming machine of claim 23, wherein the three-dimensional display device comprises a first display device and a second display device,
wherein displaying the additional information comprises displaying the additional information on the first display device, and
wherein the first three-dimensional object comprises an item displayed on the second display device that is separate from the first display device.

26. The electronic gaming machine of claim 23, wherein displaying the additional information comprises displaying the second three-dimensional object instead of the first three-dimensional object.

* * * * *